(12) United States Patent
Kimchy et al.

(10) Patent No.: US 11,333,758 B2
(45) Date of Patent: *May 17, 2022

(54) HIGH RESOLUTION UNDERGROUND ANALYSIS

(71) Applicants: Yoav Kimchy, Haifa (IL); Hadar Kimchy, Haifa (IL)

(72) Inventors: Yoav Kimchy, Haifa (IL); Hadar Kimchy, Haifa (IL)

(*) Notice: Subject to any disclaimer, the term of this patent is extended or adjusted under 35 U.S.C. 154(b) by 216 days.

This patent is subject to a terminal disclaimer.

(21) Appl. No.: 16/862,701

(22) Filed: Apr. 30, 2020

(65) Prior Publication Data
US 2020/0256987 A1 Aug. 13, 2020

Related U.S. Application Data

(62) Division of application No. 16/492,189, filed as application No. PCT/IL2018/050417 on Apr. 12, 2018, now Pat. No. 10,677,920.

(30) Foreign Application Priority Data

Apr. 19, 2017 (IL) .......................................... 251808

(51) Int. Cl.
| | | |
|---|---|---|
| *G01S 15/88* | (2006.01) | |
| *G01S 7/527* | (2006.01) | |
| *G01S 7/54* | (2006.01) | |

(52) U.S. Cl.
CPC .............. *G01S 15/88* (2013.01); *G01S 7/527* (2013.01); *G01S 7/54* (2013.01)

(58) Field of Classification Search
CPC . G01S 15/88; G01S 7/527; G01S 7/54; G01S 15/42; G01S 15/10; G01S 15/86; G01S 13/88; G01S 15/87; G01S 7/003; G01S 15/876; G06F 3/043; G06F 3/04815; G06F 3/16; G06F 3/165; G06F 21/608; G06F 3/1238; G06F 3/1222; G06F 3/1205; G06F 3/1286; B60W 40/00; G01B 21/06; H04R 2400/03; C09K 11/025;

(Continued)

(56) References Cited

U.S. PATENT DOCUMENTS

| | | | | |
|---|---|---|---|---|
| 4,213,194 A | * | 7/1980 | Spurlock ................... | G01V 1/30 367/47 |
| 4,458,341 A | * | 7/1984 | Goebel ..................... | G01V 1/22 367/43 |

(Continued)

*Primary Examiner* — Isam A Alsomiri
*Assistant Examiner* — Amie M Ndure
(74) *Attorney, Agent, or Firm* — Soroker Agmon Nordman

(57) ABSTRACT

A system for searching for underground entities in ground of an area, including a search probe configured to generate and deliver an acoustic signal into the ground of the area, wherein the acoustic signal uses a low frequency signal so that wavelengths of the acoustic signal are between 0.01-500 times the depth to the sought underground entity, two or more sensors positioned on the ground at about an equal distance from the search probe at different angles, an analysis device that receives measurements from the two or more sensors in the form of a measured echo signal responsive to the delivered acoustic signal, wherein said analysis device designates pairs of sensors and subtracts their echo signals to identify a difference indicating the existence of an underground entity.

19 Claims, 18 Drawing Sheets

(58) Field of Classification Search
CPC . C09K 11/06; H01L 51/0007; H01L 51/0005; H01L 51/0032; H01L 51/56; C09D 11/36
See application file for complete search history.

(56) References Cited

U.S. PATENT DOCUMENTS

| | | | |
|---|---|---|---|
| 2003/0006071 A1* | 1/2003 | Stump | G01V 3/12 |
| | | | 175/45 |
| 2004/0225444 A1* | 11/2004 | Young | G01V 1/00 |
| | | | 702/14 |
| 2006/0007423 A1* | 1/2006 | Guruprasad | G01S 13/103 |
| | | | 356/5.11 |
| 2006/0018192 A1* | 1/2006 | Jeffryes | G01V 1/005 |
| | | | 367/41 |
| 2007/0195644 A1* | 8/2007 | Marples | G01V 1/005 |
| | | | 367/39 |
| 2009/0238038 A1* | 9/2009 | Bagaini | G01V 1/04 |
| | | | 367/37 |
| 2010/0085836 A1* | 4/2010 | Bagaini | G01V 1/30 |
| | | | 367/41 |
| 2013/0333974 A1* | 12/2013 | Coste | G01V 1/137 |
| | | | 181/119 |
| 2016/0161620 A1* | 6/2016 | Hoeber | G01V 1/003 |
| | | | 702/14 |

* cited by examiner

HIGH RESOLUTION UNDERGROUND ANALYSIS

FIELD OF THE DISCLOSURE

The present disclosure relates generally to the analysis of the sub-surface of the earth with acoustic signals to detect deviations such as voids, air pockets, tunnels, pipes and geological abnormalities.

BACKGROUND OF THE DISCLOSURE

In many cases it is desirable to locate underground voids, tunnels, pipes or even a sizable volume having a different density than the surrounding material without digging up the ground to determine if such an entity exists and pin-point its location.

The technology available today allows reliable detection of large voids underground using high power pulse signals with time of travel based analysis, and the detection of smaller voids typically close to the surface using seismic waves or ground penetrating radar. Typically the available technology is capable of penetrating up to 10 meters in depth for the detection of small voids (typically of 1-5 meters in diameter) depending on ground conditions such as water content, type of ground composition etc.

However with the current available technologies, it is not possible to reliably detect and locate small voids or tunnels deep underground. Typically, smuggling tunnels, tunnels for infiltration under fences and the like are dug 10-80 meters underground enabling these tunnels to be undetected with the current available technologies. These tunnels typically of 1-5 meters in diameter pose a serious threat as they can be used for illegal actions such as smuggling and carrying out terror attacks.

Also in the field of archeology and geology in many case it is desirable to be able to locate the exact location of sub-surface artifacts and/or abnormalities without performing random digging.

SUMMARY OF THE DISCLOSURE

An aspect of an embodiment of the disclosure, relates to a system and method for searching for underground entities in the ground of an area. The system uses a search probe to generate and deliver an acoustic signal into the ground of the area. The acoustic signal uses a low frequency signal so that the wavelengths of the acoustic signal are between 0.01-500 times the depth to the sought underground entity. The system further includes two or more sensors positioned at different angles on the circumference of a circle with the search probe in the center. The sensors receive echo signals responsive to the delivered signal. The system further includes an analysis device that designates pairs of sensors and subtracts the signals measured by each designated pair of sensors from each other to form a difference signal.

In an exemplary embodiment of the disclosure, if the ground does not contain anomalies, the difference signal should have values below a threshold value or below a threshold signal. Whereas if an entity such as a large void, a tunnel, a large pipe, a large body of fluid (e.g. water or oil) or an artifact that differs significantly from the surrounding soil, then the difference signal will be larger than the threshold. Additionally, comparing the difference signal from pairs positioned at different angles on the circumference of the circle will provide an indication of the existence of an underground entity. In an exemplary embodiment of the disclosure, the pairs are designated so the sensors of each pair are approximately orthogonal to each other. Optionally, the acoustic signal is generated to have a low frequency of up to about 300 Hz, wherein the acoustic signal may be of a specific frequency, a continuously changing frequency or may scan a range of frequencies by incrementally using each specific frequency for a preselected time duration and then incrementing to the next frequency.

In an exemplary embodiment of the disclosure, a single search probe and single sensor can be used by deploying them at the same relative angle and distance consecutively over an area. Detecting an underground searched entity is achieved by subtracting the measured results from two or more locations to locate a significant difference indicating the existence of the searched entity underneath.

There is thus provided according to an exemplary embodiment of the disclosure, a system for searching for underground entities in ground of an area, comprising:

A search probe configured to generate and deliver an acoustic signal into the ground of the area; wherein the acoustic signal uses a low frequency signal so that wavelengths of the acoustic signal are between 0.01-500 times the depth to the sought underground entity;

Two or more sensors positioned on the ground at about an equal distance from the search probe at different angles;

An analysis device that receives measurements from the two or more sensors in the form of a measured echo signal responsive to the delivered acoustic signal:

Wherein said analysis device designates pairs of sensors and subtracts their echo signals to identify a difference indicating the existence of an underground entity.

In an exemplary embodiment of the disclosure, the designated pairs of sensors are positioned approximately orthogonal to each other relative to the search probe. Alternatively or additionally, the designated pairs of sensors are positioned to form an angle of between 85 to 95 degrees between them relative to the search probe. In an exemplary embodiment of the disclosure, the difference is identified by comparing a result of the subtracted signals to a threshold value. Alternatively or additionally, the difference is identified by comparing the subtraction of multiple pairs and detecting a distinct deviation. In an exemplary embodiment of the disclosure, an even number of sensors is used. Alternatively, an odd number of sensors is used and at least one sensor is paired twice. In an exemplary embodiment of the disclosure, at least one sensor is ignored. Optionally, a direction of the search entity is determined by detecting the search entity on two opposite sides of the search probe. In an exemplary embodiment of the disclosure, the delivered acoustic signal has a frequency that advances incrementally between about 2 to 300 Hz to scan for a preselected time at each frequency. Alternatively, the delivered acoustic signal has a frequency that varies continuously from about 2 to 300 Hz. Further alternatively, the delivered acoustic signal has a specific frequency between 2 to 300 Hz. In an exemplary embodiment of the disclosure, the distance from the search probe to the sensors is between 1 to 60 meters.

There is further provided according to an exemplary embodiment of the disclosure, a method for searching for underground entities in ground of an area, comprising:

Generating an acoustic signal into the ground of the area with a search probe; wherein the acoustic signal uses a low frequency signal so that wavelengths of the acoustic signal are between 0.01-500 times the depth to the sought underground entity;

Measuring echo signals responsive to the delivered acoustic signal with sensors from two or more positions on the ground at about an equal distance from the search probe at different angles;

Receiving the measured echo signals from the two or more sensors by an analysis device;

Designating pairs of sensors and subtracting their echo signals to identify a difference indicating the existence of an underground entity.

In an exemplary embodiment of the disclosure, the designated pairs of sensors are positioned approximately orthogonal to each other relative to the search probe. Optionally, the difference is identified by comparing a result of the subtracted signals to a threshold value. Alternatively or additionally, the difference is identified by comparing the subtraction of multiple pairs and detecting a distinct deviation. Optionally, a direction of the search entity is determined by detecting the search entity on two opposite sides of the search probe. In an exemplary embodiment of the disclosure, the delivered acoustic signal has a frequency that advances incrementally between about 2 to 300 Hz to scan for a preselected time at each frequency. Alternatively, the delivered acoustic signal has a specific frequency between 2 to 300 Hz.

There is further provided according to an exemplary embodiment of the disclosure, a system for searching for underground entities in ground of an area, comprising:

A search probe configured to generate and deliver an acoustic signal into the ground of the area; wherein the acoustic signal uses a low frequency signal so that wavelengths of the acoustic signal are between 0.01-500 times the depth to the sought underground entity;

One or more sensors positioned on the ground at about an equal distance from the search probe at different angles;

An analysis device that is configured to receive measurements in the form of a measured echo signal responsive to the delivered acoustic signal from respective sensors of consecutive deployments of the search probe and sensors; wherein the respective sensors are positioned with the same relative distances and angles in each deployment; and Wherein said analysis device designates pairs of respective sensors from consecutive deployments and subtracts their echo signals to identify a difference indicating the existence of an underground entity.

There is further provided according to an exemplary embodiment of the disclosure, a method for searching for underground entities in ground of an area, comprising:

Generating an acoustic signal into the ground of the area with a search probe; wherein the acoustic signal uses a low frequency signal so that wavelengths of the acoustic signal are between 0.01-500 times the depth to the sought underground entity;

Measuring echo signals responsive to the delivered acoustic signal with sensors from one or more positions on the ground at about an equal distance from the search probe at different angles;

Receiving the measured echo signals from the one or more sensors by an analysis device;

Deploying the search probe and one or more sensors at the same relative distances and angles in consecutive locations;

Repeating the measurements at the consecutive locations; and

Designating respective pairs of sensors from the same distance and angle in consecutive locations and subtracting their echo signals to identify a difference indicating the existence of an underground entity.

BRIEF DESCRIPTION OF THE DRAWINGS

The present disclosure will be understood and better appreciated from the following detailed description taken in conjunction with the drawings. Identical structures, elements or parts, which appear in more than one figure, are generally labeled with the same or similar number in all the figures in which they appear, wherein.

DETAILED DESCRIPTION

Figure 1A:
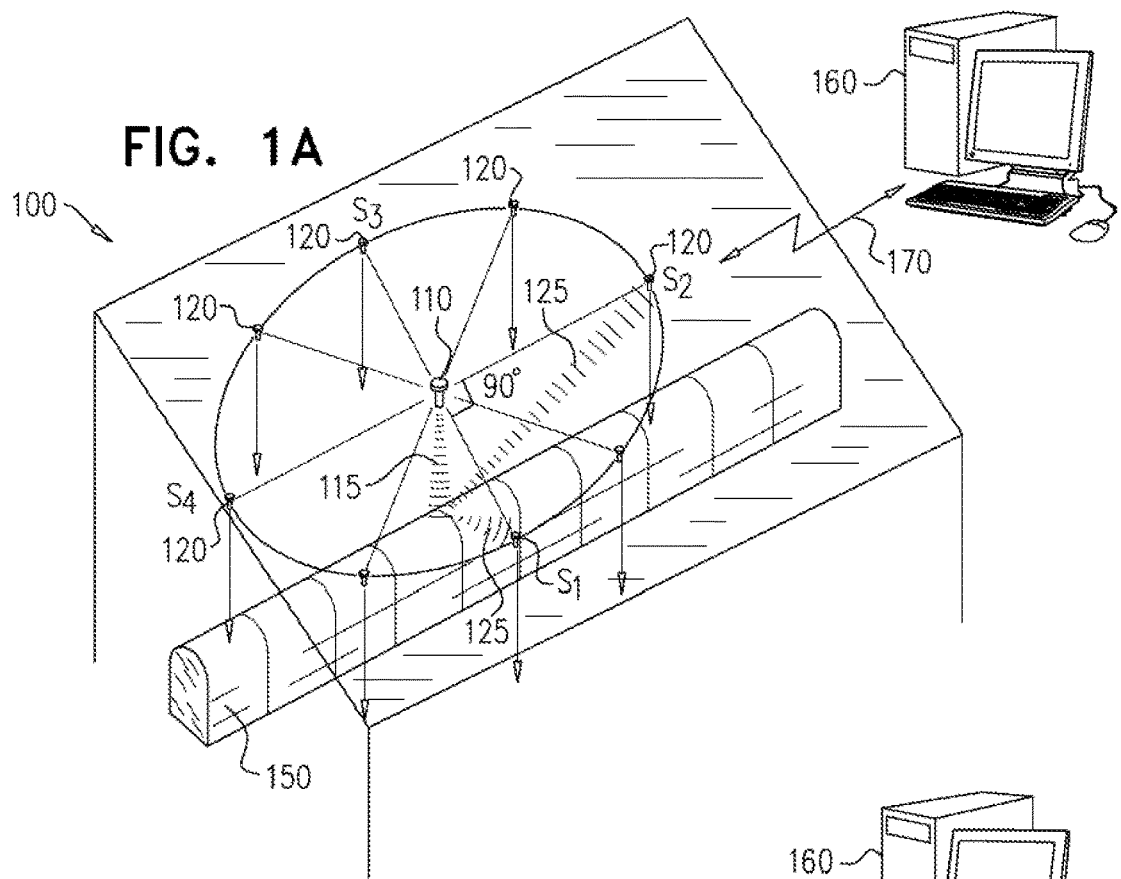
FIG. 1A is a schematic illustration of a system for analyzing a sub-terrain, according to an exemplary embodiment of the disclosure.

FIG. 1A is a schematic illustration of a system 100 for analyzing a sub-terrain, according to an exemplary embodiment of the disclosure. System 100 includes a search probe 110 that generates an acoustic signal 115 for analyzing the sub-terrain below the search probe 110, for example to locate a tunnel, void, pipe or other sizeable searched entity 150. In an exemplary embodiment of the disclosure, it is desirable to scan the sub-terrain with an acoustic signal 115 having a wavelength ($\lambda$) of about 0.01-500 times the depth to the searched entity 150 (e.g. with the depth between 100$\lambda$ to 0.002$\lambda$ or even between 0.25$\lambda$ to 0.025$\lambda$ ($\lambda/4-\lambda/40$)). Since the depth is generally unknown, a set of acoustic signals 115 with varying wavelengths may be used to determine the actual depth (e.g. with a depth between 1-100 meters). This can be achieved by generating acoustic signals 115 with varying low frequencies (e.g. between about 2 Hz to 300 Hz). The actual required frequency for generating a specific wavelength depends on the ground conditions (e.g. soil/rock type, soil density and water content, which affect the wave propagation speed (the wavelength is a function of the wave speed divided by frequency)).

In an exemplary embodiment of the disclosure, the search probe 110 may be a mechanical vibrating device, an acoustic transducer or other device that can generate low frequency acoustic signals 115. Optionally, the search probe 110 is a mechanical probe that is placed on the ground to form direct contact with the ground. In an exemplary embodiment of the disclosure, the search probe 110 is formed using an eccentric weight rotating around an axis, a hydraulic piston moving a weight up and down to create pressure waves in the ground or by other means.

In an exemplary embodiment of the disclosure, system 100 includes one or more sensors 120 or optionally at least two sensors, each sensor is for example a low frequency acoustic receiving transducers. The sensors can be for example geophones, accelerometers or other devices that can receive low frequency acoustic signals. Optionally, the sensors 120 are positioned around the search probe 110 at an equal distance (radius), for example in a circle around the search probe 110. In an exemplary embodiment of the disclosure, the sensors 120 are designated to function in pairs, wherein each pair of sensors are positioned such that they form approximately a right angle (e.g. between 85-95 degrees) relative to each other relative to the position of the search probe 110 (e.g. S1 is at a right angle with S2 and S3 is at a right angle with S4). The radius from the search probe 110 to the sensors 120 is typically selected to be between 1 to 60 meters to enable system 100 to be able to sense faint echo signals. For example the radius may be selected to be 1-60 meters or to be about the expected depth of the searched entity 150.

Optionally, the search probe 110 and the sensors 120 may be coupled together rigidly so that they may be positioned and relocated as a single unit (e.g. lifted and relocated by a tractor or crane). Alternatively, the sensors 120 may be independent to prevent interference by one moving the other and they are repositioned around a position selected for placing the search probe 110. Optionally, the sensors can be accurately positioned by tracking their position with a high precision GPS receiver. In some embodiments of the disclosure, the system 100 is deployed using a fleet of vehicles that are directed into position, for example one vehicle holding search probe 110 and 2, 3, 4 or more holding sensors 120.

In an exemplary embodiment of the disclosure, the search probe 110 is placed on the ground and configured to generate an acoustic signal 115 comprising acoustic waves of low frequency (e.g. between 2 Hz to 300 Hz). Optionally, the acoustic signal 115 is configured to scan a range of frequencies sequentially, for example searching from 2 to 300 Hz starting at 2 Hz (e.g. 2, 4, 6, 8 . . . ) and advancing by a preselected step of for example 1-20 Hz. Optionally, the frequency is advanced every few seconds or tens of seconds to provide time to reach a steady state (e.g. scanning for a preselected number of seconds such as every ten seconds or every twenty second). Alternatively, a signal that varies continuously between about 2-300 Hz can be used. In some embodiments of the disclosure, a specific frequency or group of frequencies in the range of about 2-300 Hz is used, for example after determining which frequency induces a significant response or when the scanned depth and composition of the soil is known.

In an exemplary embodiment of the disclosure, a recording of the acoustic signal 115 (transmitted from the search probe 110) and/or received echo signal 125 (by the sensors 120) are provided to an analysis device 160 such as a computer or another analysis device (e.g. a dedicated electronic circuit). Optionally, analysis device 160 records the information (e.g. digital representation of the received echo signals) for offline analysis or for analysis in real-time. In an exemplary embodiment of the disclosure, analysis device 160 provides results within a short period (e.g. a few seconds) after examining a location to allow a user to determine if it is necessary to continue checking and in what direction.

In an exemplary embodiment of the disclosure, the information is transferred to the analysis device 160 over a wired connection or alternatively by a wireless signal 170 using a wireless connection (e.g. over a dedicated RF connection, Wi-Fi, Blue-tooth or other type of connection).

In an exemplary embodiment of the disclosure, near field low frequency acoustic waves (with a wavelength ($\lambda$) of about 0.01-500 times the depth to the searched entity 150 (e.g. with the depth between 100$\lambda$ to 0.002$\lambda$ or even between 0.25$\lambda$ to 0.025$\lambda$ ($\lambda/4-\lambda/40$)) are used to allow detection of deep buried voids or tunnels with a high resolution. The advantage of using a near field effect is that this technique allows the use of low frequency acoustic waves which can penetrate deeply (e.g. 1-100 meters) into the ground with little loss of energy (due to the low frequency) while still allowing high resolution spatial separation.

In an exemplary embodiment of the disclosure, the acoustic signal 115 includes a pressure wave component that propagates downward into the ground and a shear wave component that vibrates in parallel to the surface of the ground and is orthogonal to the pressure wave. The echo signal 125 reflects a resonance of the diffraction of the transmitted acoustic signal 115 with reflected signals. Optionally, system 100 is required to wait for a number of seconds as described above until the signals reach a steady state before sampling and analyzing the echo signal.

In an exemplary embodiment of the disclosure, the depth of the searched entity 150 has a depth of between 0.01-500 times the wavelength λ of the transmitted acoustic signals 115. Thus for high resolution tunnel detection a consecutive set of scanning frequencies is used, since the tunnel depth is unknown and ground pressure wave velocities may vary. Optionally, the scanning probe 110 is programmed to generate a monotonic pressure wave or strain wave for a few second before changing to the next frequency. This creates a standing wave (resonance) at that particular frequency if there is a tunnel or void underneath the scanning probe. The fact that the generation of pressure waves or strain waves is quasi static, that is generation for a few seconds allows the waves to reach a steady state in the ground and with each new frequency no influence of the ground is related to the other frequencies and each can be seen as a stand-alone wave.

In an exemplary embodiment of the disclosure, it is desirable to place the scanning probe 110 directly above the searched entity 150 and place at least one pair of sensors 120 with one sensor 120 along the extent of the searched entity and one sensor 120 positioned perpendicular to the searched entity 150 (e.g. like S1 and S2 in FIG. 1A). However in most cases the exact position and direction of the searched entity 150 is unknown therefore multiple pairs of sensors 120 are used to find the optimal direction from the measurements. Likewise searching system 100 is positioned in multiple locations of an area to determine the position of the searched entity underground, for example incrementally progressing in a specific direction (e.g. advancing 10-500 cm with system 100). In an exemplary embodiment of the disclosure, comparison of the data from recorded echo signals 125 will enable detection of the location and direction as explained below.

Figure 2:
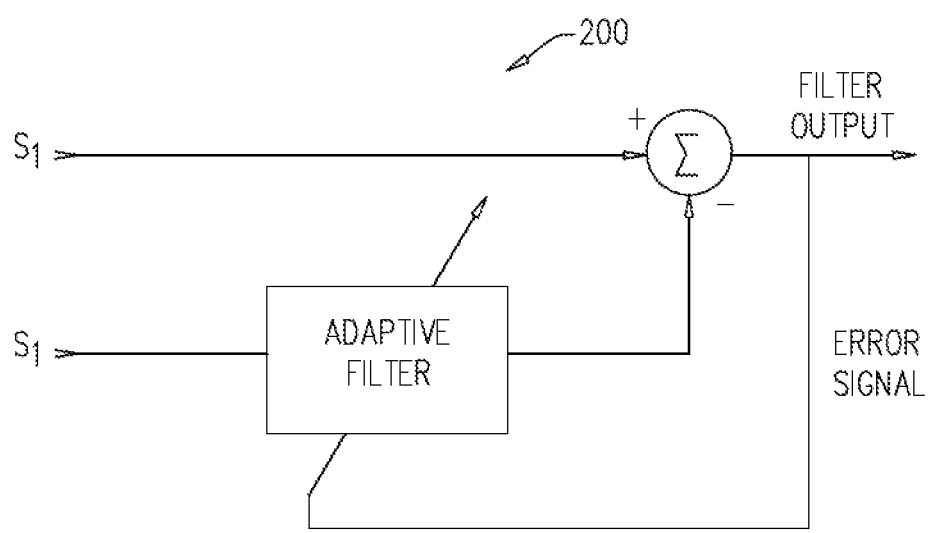
FIG. 2 is a schematic illustration of an adaptive filter for accepting signals from a pair of sensors, according to an exemplary embodiment of the disclosure.

In an exemplary embodiment of the disclosure, data from the sensors 120 surrounding search probe 110 are collected simultaneously for off line or on line analysis. Optionally, data from a pair of sensors 120 (e.g. S1, S2 or S3, S4) are subtracted from each other, for example by analysis device 160 or alternatively, each pair of sensors 120 are fed one into the reference input and the other into the signal input of an adaptive filter so that the output of the filter is the optimal subtraction between the two sensor signals. FIG. 2 is a schematic illustration of an adaptive filter 200 for accepting signals from a pair of sensors 120, according to an exemplary embodiment of the disclosure. Optionally, if there is a searched entity 150 such as a tunnel underneath the search probe 110 and passing underneath one of the sensors 120 while extending perpendicular to a paired second sensor 120, the signal from the pair of sensors will be different. Typically the signals from the pair of sensors will have a different phase and thus subtraction between the two sensor signals will give a signal that is non zero and which is not close in strength to the noise level of the system or the ambient noise. Alternatively, when there is no tunnel underneath the search probe 110 and passing underneath one of the sensors 120: since the sensors are placed at equal distance from the search probe, the subtraction of the signals from the two probes will show an output that is very small, thus differentiating between a case with and without a tunnel underneath. Changes in ground structure and densities can create some difference between one sensor 120 and the pair even without a tunnel underneath, but these changes are expected to be smaller than the effect of an air filed void of a tunnel or a large entity of significant differentiating material.

In an exemplary embodiment of the disclosure, when the direction of the suspected tunnel underneath the search probe 110 and the sensors 120 is not known, a plurality of sensors 120 can be placed in a circle around the search probe 110 and data accumulated simultaneously from all the sensors 120. Accordingly, subtraction of signals as described above is performed from pairs of sensors that are at about 90 degrees to each other, wherein the 90 degrees is taken between sensors on the circle so that the angle measured is between a sensor 120, the search probe 110 and another sensor on the circle. Optionally, by collecting results from a number of pairs the direction of the tunnel can be accurately determined. In an exemplary embodiment of the disclosure, some sensors 120 may be used more than once, for example if there is an odd number of sensors 120.

Figure 1B:
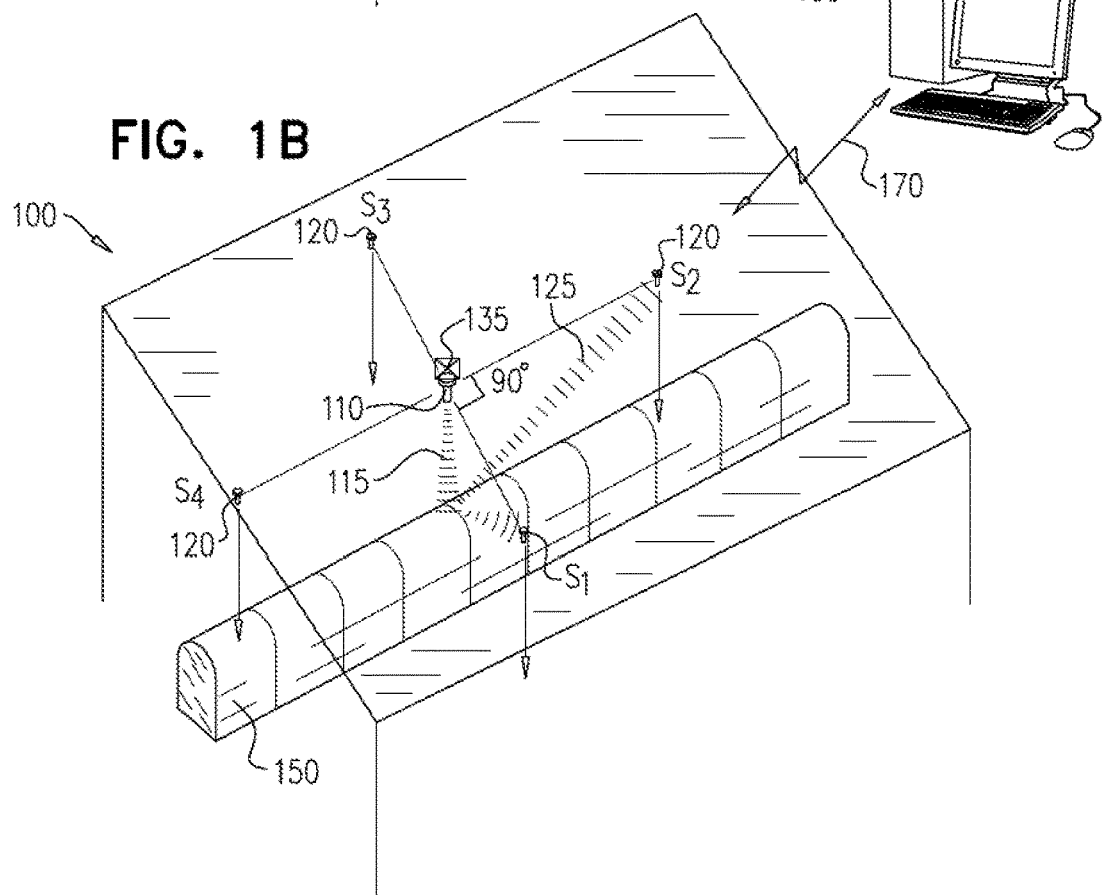
FIG. 1B is a schematic illustration of a system for analyzing a sub-terrain with four sensors, according to an exemplary embodiment of the disclosure.

In an exemplary case comprising 4 sensors 120 (e.g. as shown in FIG. 1B) the following details are defined:

Diff1=(S1−S2)

Diff2=(S1−S3)

Diff3=(S1−S4)

Thresh—An empirical value that enables to separate between differences in signals due to differences in ground structure and values due to the presence of a tunnel.

If {((Diff1−Diff2)>Thresh) AND ((Diff3−Diff1)>Thresh)}

Then a tunnel is detected and the direction of the tunnel is the line connecting S2 and S4.

Alternatively, the determination may be based directly by calculating S1-S2 and S3-S4.

In some embodiments of the disclosure, a single pair that exceeds the threshold value can be used to identify a searched entity 150. Optionally, other angles between the pair of sensors may be sufficient to identify a strong signal indicating the presence of a searched entity 150, for example 10°, 20°, 30°, 60° or more. Additionally, comparing multiple subtracted pairs and detecting a distinct deviation may provide indication of the presence of a searched entity 150 instead of comparing to a threshold value or threshold signal.

In an exemplary embodiment of the disclosure, the circle will have a radius of between 1-60 meters and sensors 120 will be positioned around the entire circumference of the circle. Alternatively, only a sector of the circle will include sensors 120 (e.g. along one quarter or half of the circumference of the circle). Optionally, the number of sensors placed on the circle will depend on the radius and the required resolution. In an exemplary case if the sensors are placed on a circle with a radius of 20 meters, the circumference of the circle will be $2*\pi*R=\sim 6.28*20=125.6$ meters. In this case, if a resolution of 1 meter is required, then approximately 125-126 sensors will be placed around the circumference of the circle with the search probe 110 at the center. In an exemplary embodiment of the disclosure, as the search probe 110 is advanced in typically 1 meter intervals, the 125-126 sensors 120 placed around the search probe 110 need to be advance with it while staying in the same location relative to the search probe. Optionally, a reduction in the number of sensors 120 can affect the resolution in determining the exact location of the searched entity 150.

It can be appreciated that it is advantageous to have a relatively small circle of sensors 120 in order to reduce the number of sensors 120 that need to be moved every time the search probe 110 is moved. For this, the strength of the search probe acoustic signal needs to be optimized so that on the one hand, it will suffice to generate a signal that will reach the desired depth of a possible searched entity 150 and have enough strength so that the echo signals 125 will reach the surface and the sensors 120 with sufficient signal strength, and on the other hand, have a low enough acoustic signal 115 so as to allow use of a small radius for the circle of sensors 120 without causing distortions due to overloading of the sensors.

In some embodiments of the disclosure, some of the sensors 120 may be paired with more than one other sensor 120 to reduce the number of required sensors and allow use of an odd number of sensors. For example using 3 sensors S1, S2 and S3 and calculating by pairing S1 with S2 and S3 with S2. Optionally, when using many sensors (e.g. over 20 sensors) the accuracy is sufficient to allow using angles of 85°-95° to be used for pairing the sensors and subtracting echo signals.

In an exemplary embodiment of the disclosure, when calculating the subtraction pairs for each search position, it is possible to detect the tunnel direction going into the circle of sensors and going out of the circle of sensors, so the direction of the tunnel under the circle can be clearly detected. This also helps to separate between true and false detections as a tunnel will have 2 places around the circumference where the signals will be larger than the threshold (see above) as this will not typically occur for a false reading.

The use of a wavelength of the order of the depth (near field) is not limited by the diffraction limit that usually constrains imaging systems to be at least D>=2λ where D is the system resolution. That is, the smallest object that can be resolved is at least 2 times the wavelength. In near field "imaging", the system resolution is determined by the scan step distance. That is, if the transmitting source size is negligible relative to the wave length, the imaging resolution can be orders of magnitude smaller than the wavelength λ and is practically the search distance interval (e.g. 10-500 cm).

Optionally, use of a low frequency signal is advantageous since as the frequency of the transmitted acoustic signal is increased, ground absorption of the signal is substantially increased. Thus it is not possible using a high frequencies signal to detect more than a few meters below ground let alone hope to detect returning signals. As an example, using standard imaging technique, (not near field imaging) in order to detect a 1 meter wide tunnel the wave length λ should be less than 0.5 meters. For ground with an acoustic velocity of 2000 m/sec this means a signal frequency of 10,000 Hz. The typical ground absorption for this frequency is 0.0167 dB/m/Hz dB/m. So at 1 m, already 167 dB loss means no signal can travel past a few centimeters before it is practically all absorbed. It is therefore advantageous to use low frequency acoustic signals which have low absorption in the ground and can travel hundreds of meters with good signal strength.

In an exemplary embodiment of the disclosure, when a low frequency near field (wave length in the order of the distance from the search probe to the target) acoustic signal is transmitted towards a void or tunnel in the ground, some of the acoustic energy is reflected from the void or tunnel and as a consequence, a detector above the void or tunnel will sense the acoustic signals reflected from the void or tunnel.

On the ground surface, shear waves are formed that travel away from the acoustic signal transmitter. If sufficient time is given, a wave pattern is created on the surface due mainly to the surface shear waves. The interaction of the reflected pressure waves from the tunnel and other structures in the ground and the surface shear waves create an interference pattern, which can be thought of as a "Hologram" (similar in concept to laser induced holograms on film. A laser beam is split and one part of the laser beam goes to the film directly while the other is directed towards the imaged object, and the return reflections go back to the film. This creates a 2D interference pattern on the film. Later, when a laser beam with the same frequency is directed on the developed film, a "hologram" can be seen which is a 2D mapping of the 3d object) where the 3D information of the ground underneath is mapped into a 2D "Hologram" of phase interference on the ground surface. Thus, placing sensors on the surface and analyzing the phase data, it is possible to reconstruct the 3D information of the acoustic wave's interactions in the 3D ground block below the surface.

If multiple sensors are placed on the ground in an array with sufficiently small distances between them, a 2D phase array can be acquired that will allow for the reconstruction of the 3D space bellow. Using the data from the sensors on the ground, the 3D composition of the ground can be reconstructed by using the 2D mapped phase information for each separate frequency as well as by using spectral analysis of the signals reflected from objects in the ground, it is possible to discriminate between a tunnel which is filled with air, a rock, sand or other objects that are buried in the ground.

Figure 3:
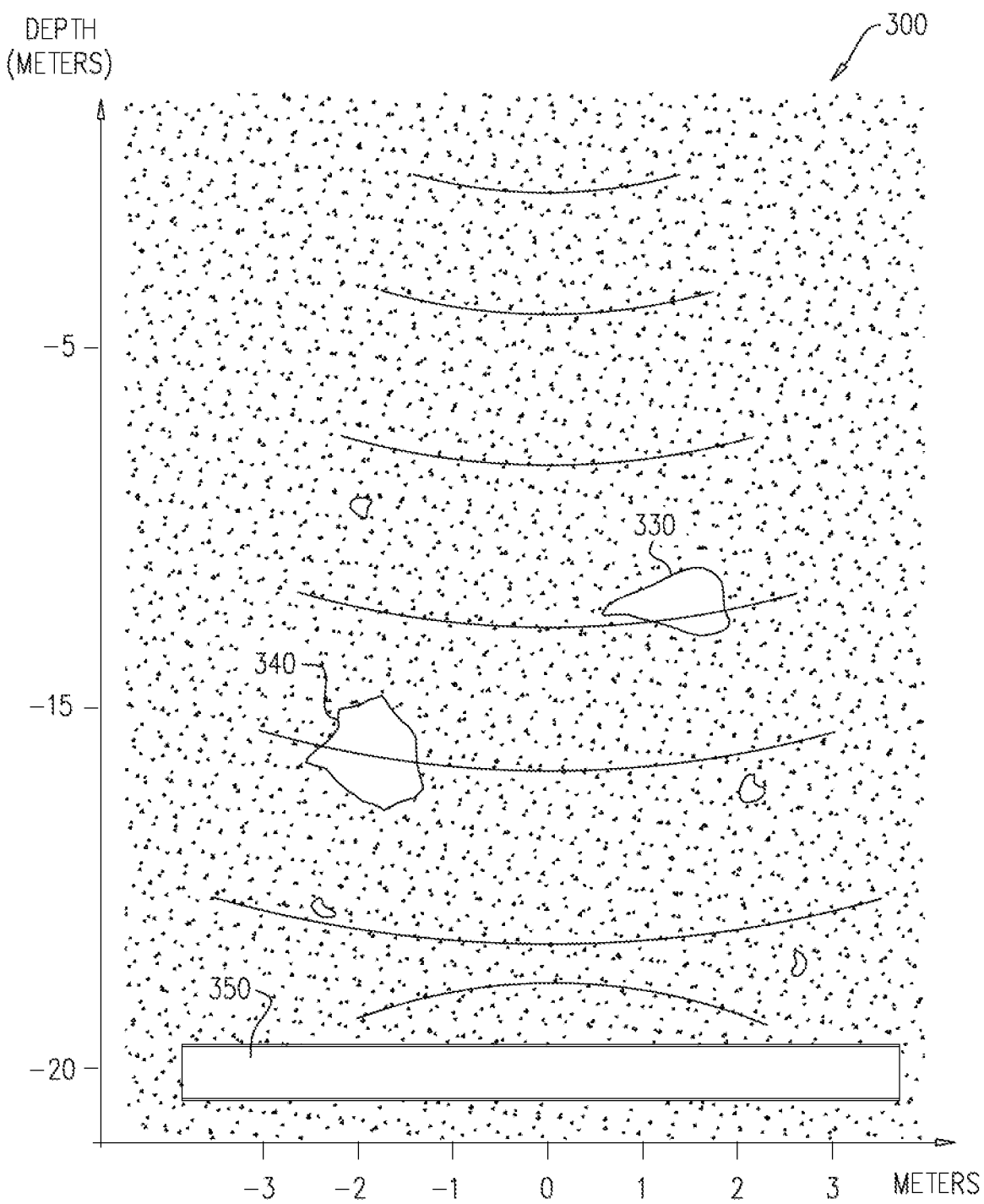
FIG. 3 is a schematic illustration of a multi spectral reconstruction allowing the discrimination between sand, rock and an air filled tunnel, according to an exemplary embodiment of the disclosure.

FIG. 3 is a schematic illustration of a multi spectral reconstruction 300 allowing the discrimination between sand 330, rock 340 and an air filled tunnel 350, according to an exemplary embodiment of the disclosure.

For the purpose of detection of tunnels, it is sufficient to collect data on a 1D line perpendicular to the expected tunnel direction and thus allow the use of 1D phase data to reconstruct the perpendicular 2D surface below. Thus by utilizing near field imaging techniques, an imaging system is achieved that is able to use low frequency acoustic waves having good penetration with very little loss in the ground to detect small voids or tunnels deep within the ground, while still having good resolution to enable detection of small objects such as a tunnel or other searched entities 150 buried deep in the ground.

Figure 4:
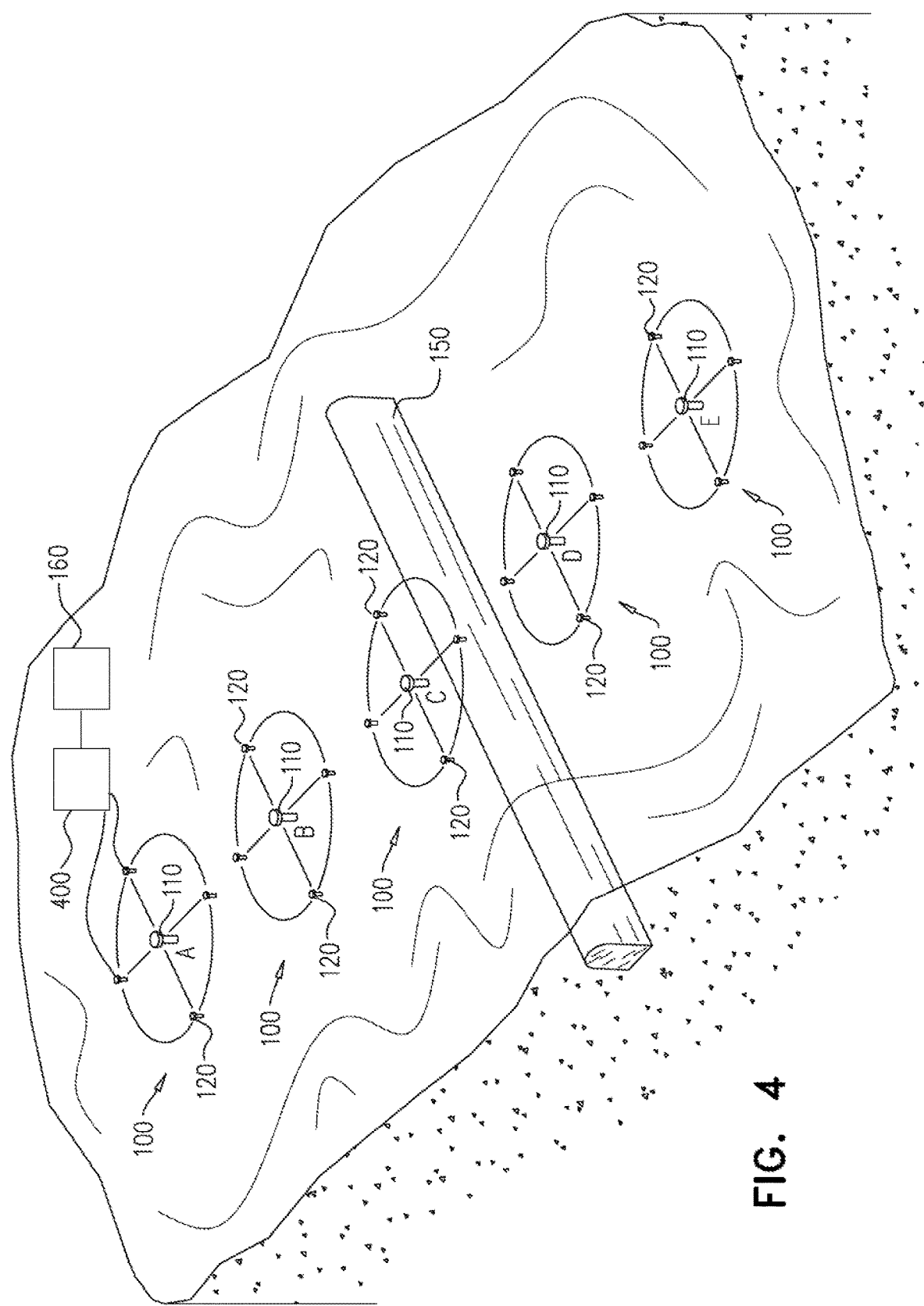
FIG. 4 is a schematic illustration of multiple systems sampling an area, according to an exemplary embodiment of the disclosure.
Figure 5:
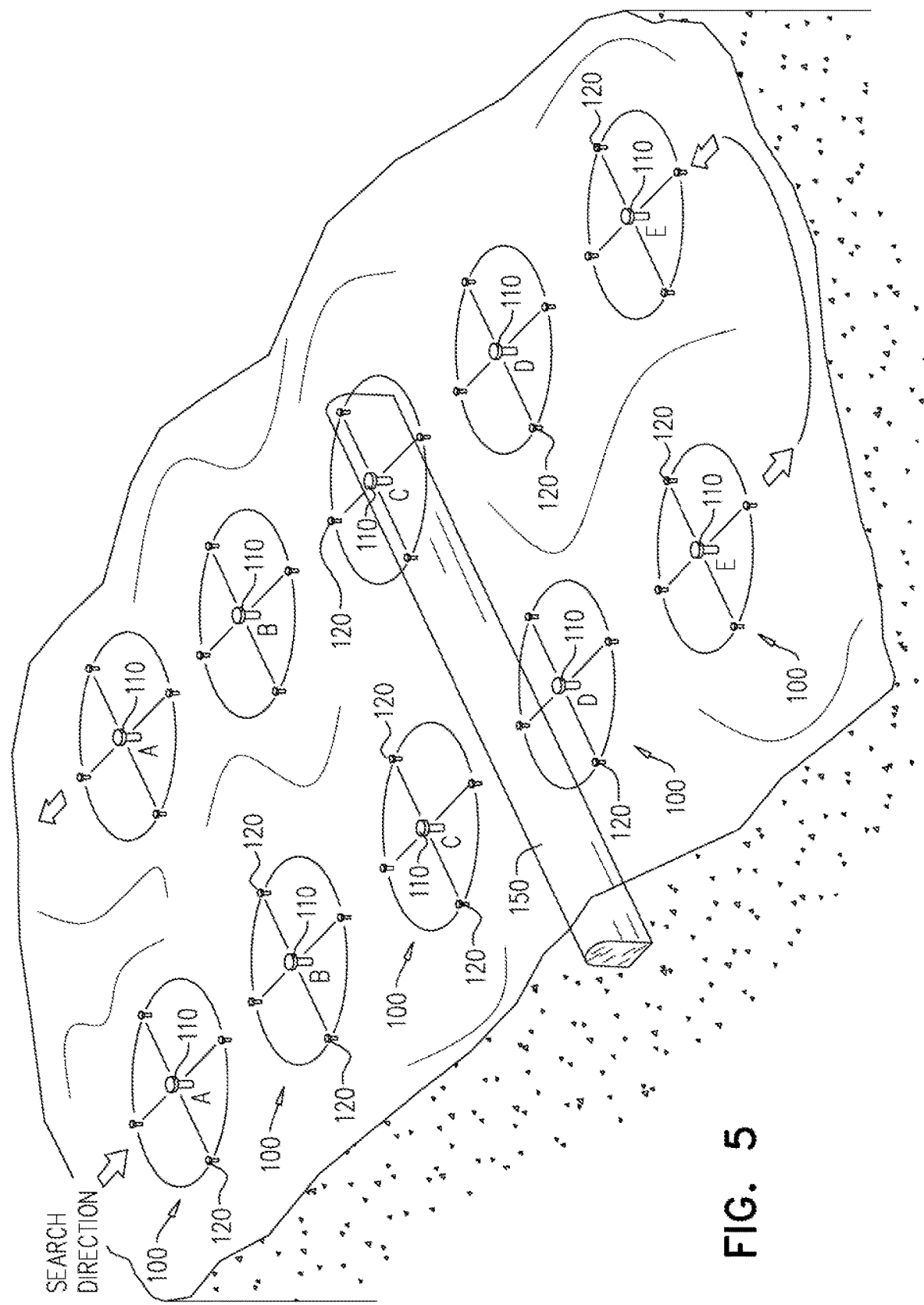
FIG. 5 is a schematic illustration of a single system that is advanced to cover an area, according to an exemplary embodiment of the disclosure.

In an exemplary embodiment of the disclosure, multiple systems 100 may be deployed over an area or a single system 100 may be advanced incrementally over an area system 100 to sample an entire area. FIG. 4 is a schematic illustration of multiple systems 100 sampling an area simultaneously at locations A, B, C, D and E. In contrast FIG. 5 is a schematic illustration of a single system 100 that is advanced sequentially to cover an area. Optionally, at each position system 100 is activated for a period of 1-1000 seconds to reach a steady state and complete the measurements. The measurements from the sensors 120 of the single system 100 or the multiple systems 100 are transmitted to an adaptive filter 200 (see FIG. 2) and then to a computer or directly to computer for analysis. Optionally, to prevent false positive detections (e.g. natural voids) the area may be divided into a number of parallel strips and each strip analyzed separately to provide a map of the underground surface and determine if a searched entity 150 is continuous over an extended area (e.g. like a tunnel or pipe). In an exemplary embodiment of the disclosure, once a specific location provides a positive result the area around that location will be sampled to determine how the suspected tunnel/searched entity 150 propagates. Optionally, system 100 is advanced by at least the radius from the search probe 110 to the sensors 120 (e.g. 10-50 meters) to optimize the measurements. Alternatively, system 100 may be advanced by a smaller length (e.g. when receiving a positive identification) to enhance accuracy of the results.

In an exemplary embodiment of the disclosure, the sensors 120 include an amplifier and analog to digital converter (ADC) for preparing the signals and sending them to analysis device 160. Alternatively, the amplifier and analog to digital converter may be provided as a separate unit 400 that receives the signals before the analysis device 160.

In an exemplary embodiment of the disclosure, taking a ground sample from the area being sampled to determine earth density as a function of depth and/or position in the area can help to predict the expected behavior of the acoustic signal in the ground. When a void exists the effect on the pressure wave and shear wave will be clearly different than when the ground is uniformly filled with soil. Optionally, the measured results can be compared to simulated results to identify anomalies (e.g. rocks, sand or other materials) and estimate the actual depth.

In an exemplary embodiment of the disclosure, the results of the measurements and comparisons/subtractions from the sensors 120 at a single location or at multiple locations (e.g. A, B, C, D and E as shown in FIG. 4) are analyzed to determine a frequency or frequencies, which exceed a threshold value or define an increasing trend. For example by mapping the results in graphs such as set forth in FIGS. 6A, 6B, 7A, 7B, 8 and 9 and viewing the results of a single location and/or comparing the power spectral density of multiple locations a user can determine a frequency or range of frequencies, which indicate that a search entity 150 exists at about that range of frequencies. Optionally, the user can then determine the approximate depth of the search entity 150 from the range of frequencies.

Figure 6A:
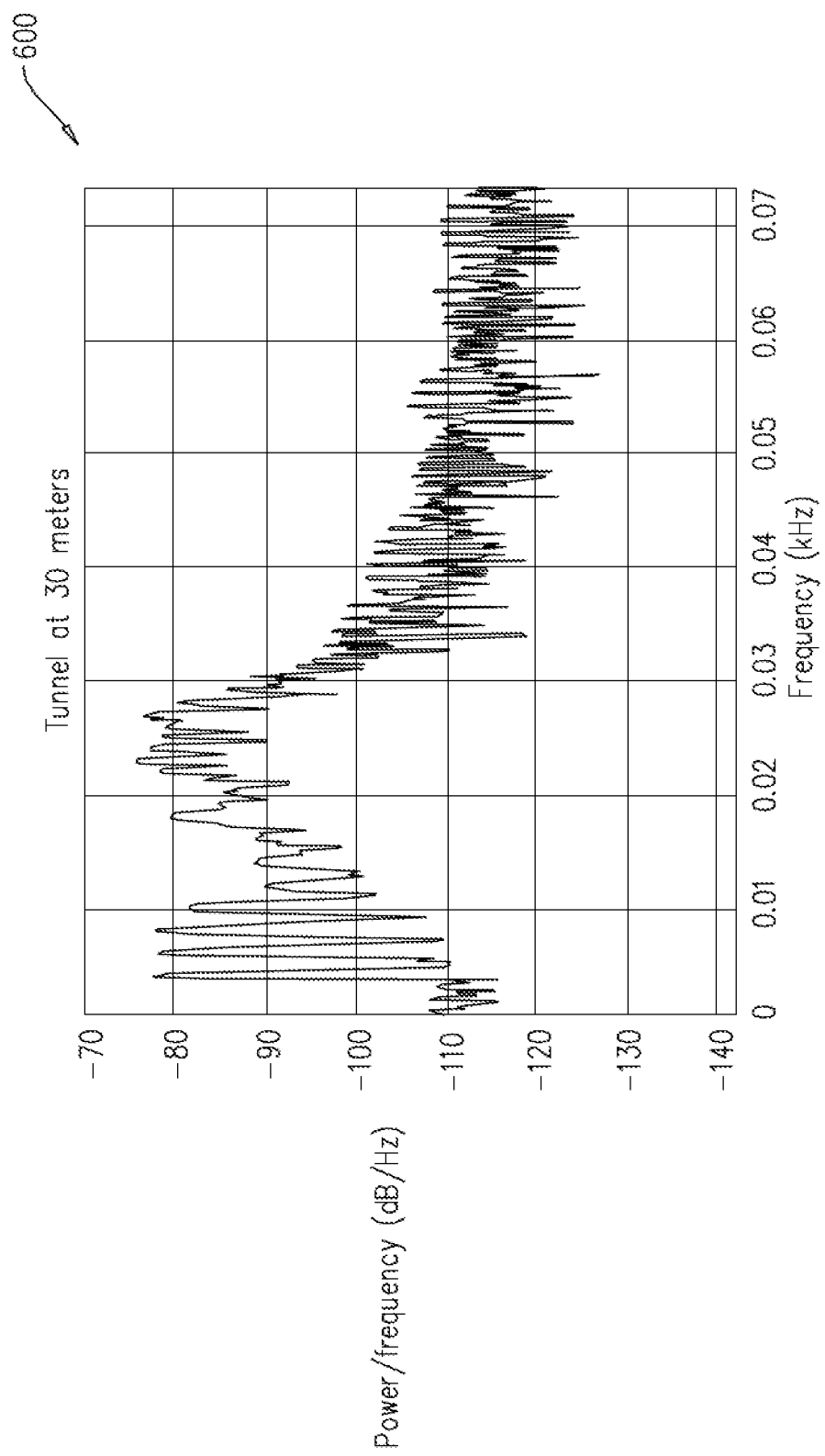
FIG. 6A is a graph of simulation results showing power spectral density versus frequency in a case having a tunnel at 30 meters below the search probe; according to an exemplary embodiment of the disclosure.
Figure 7A:
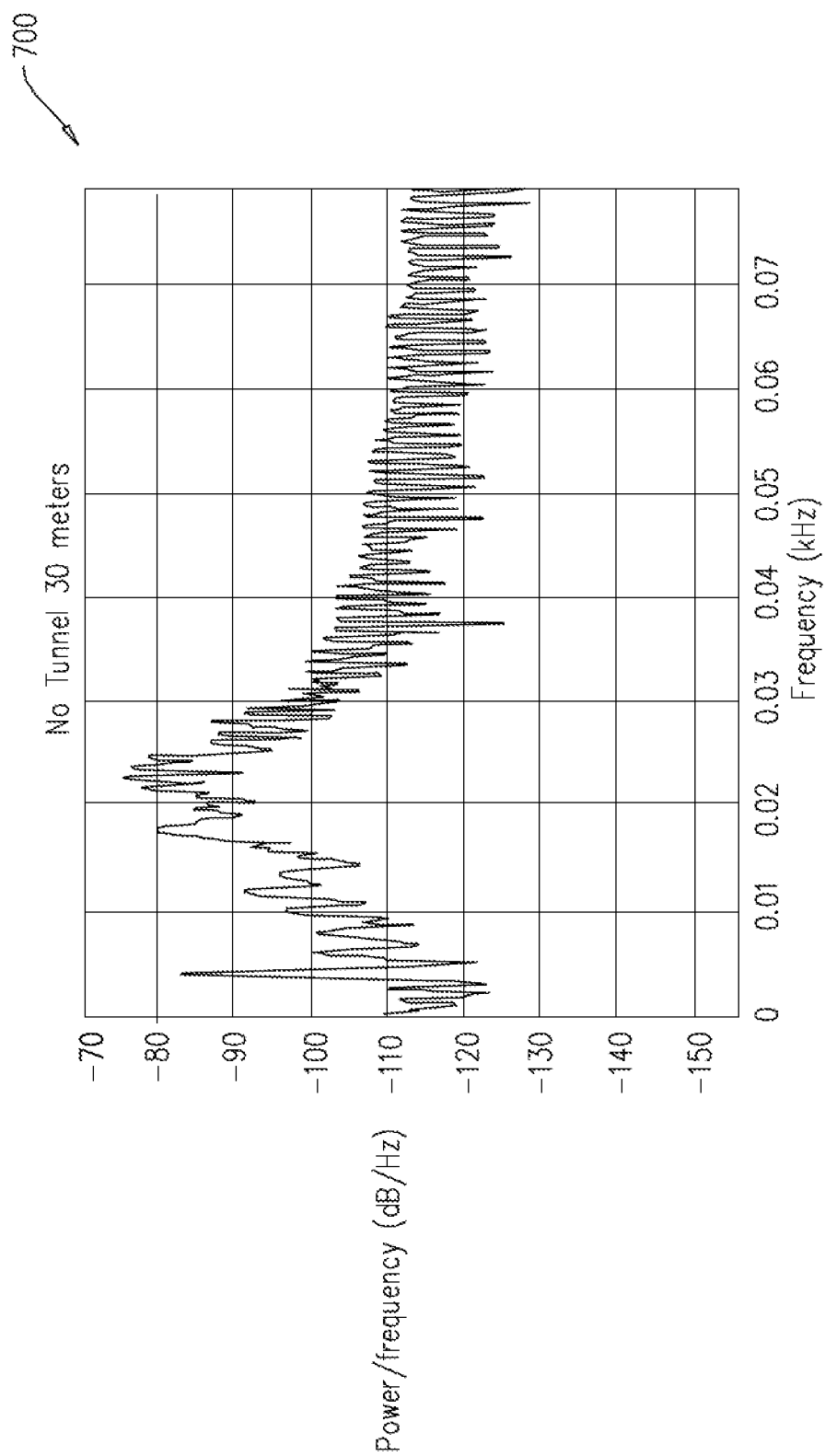
FIG. 7A is a graph of simulation results showing power spectral density versus frequency in a case not having a tunnel; according to an exemplary embodiment of the disclosure.

FIG. 6A is a graph 600 of simulation results showing power spectral density versus frequency in a case having a tunnel at about 30 meters deep and FIG. 7A is a graph 700 of simulation results showing power spectral density versus frequency in a case not having a tunnel. As can be seen by comparing the signals between frequencies 0 to 0.01 KHz (0 to 10 Hz) the tunnel caused a leap in the power by about 20 DB (from −100 to −80).

Figure 6B:
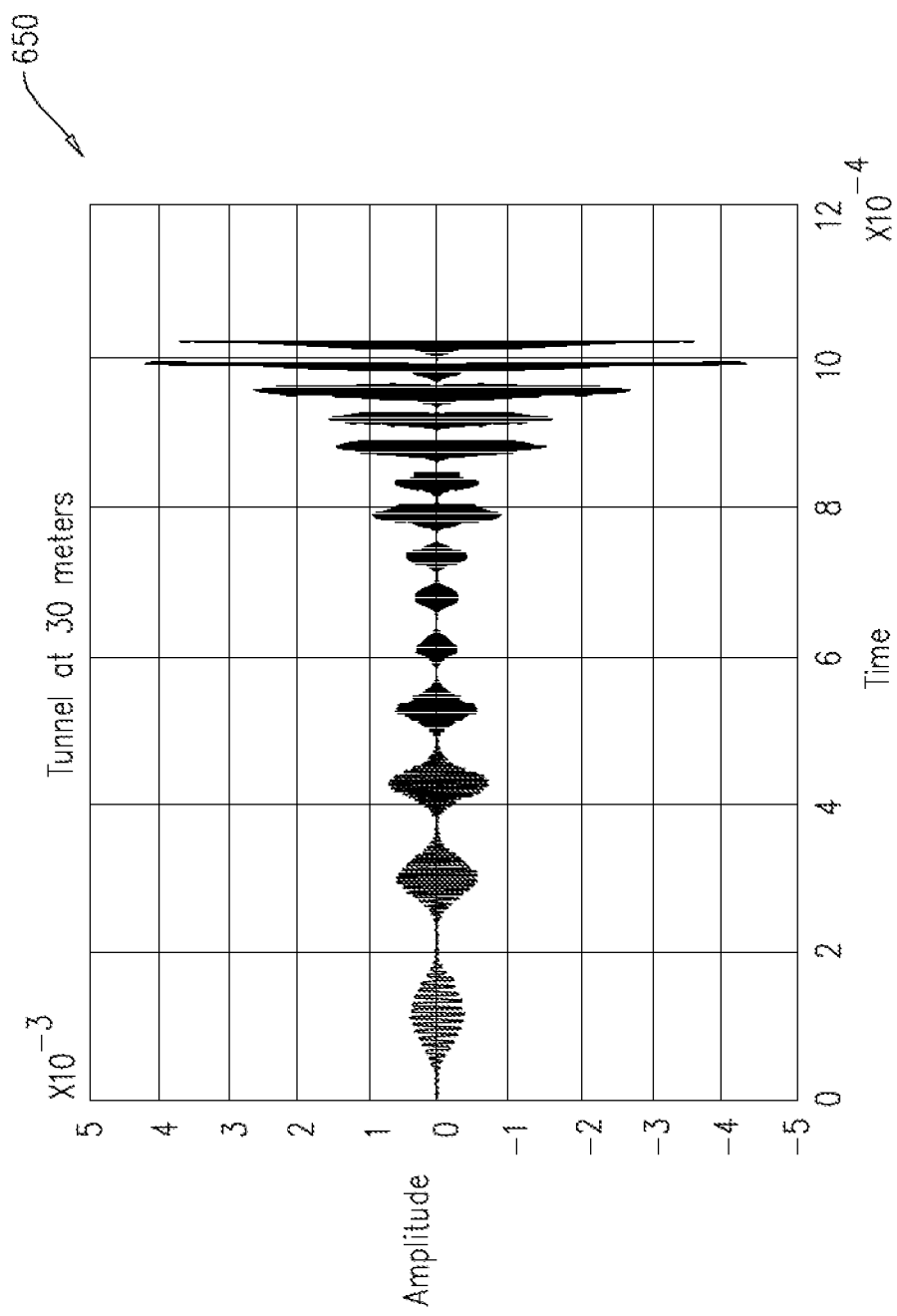
FIG. 6B is a graph of simulation results of the signal of FIG. 6A in time domain; according to an exemplary embodiment of the disclosure.
Figure 7B:
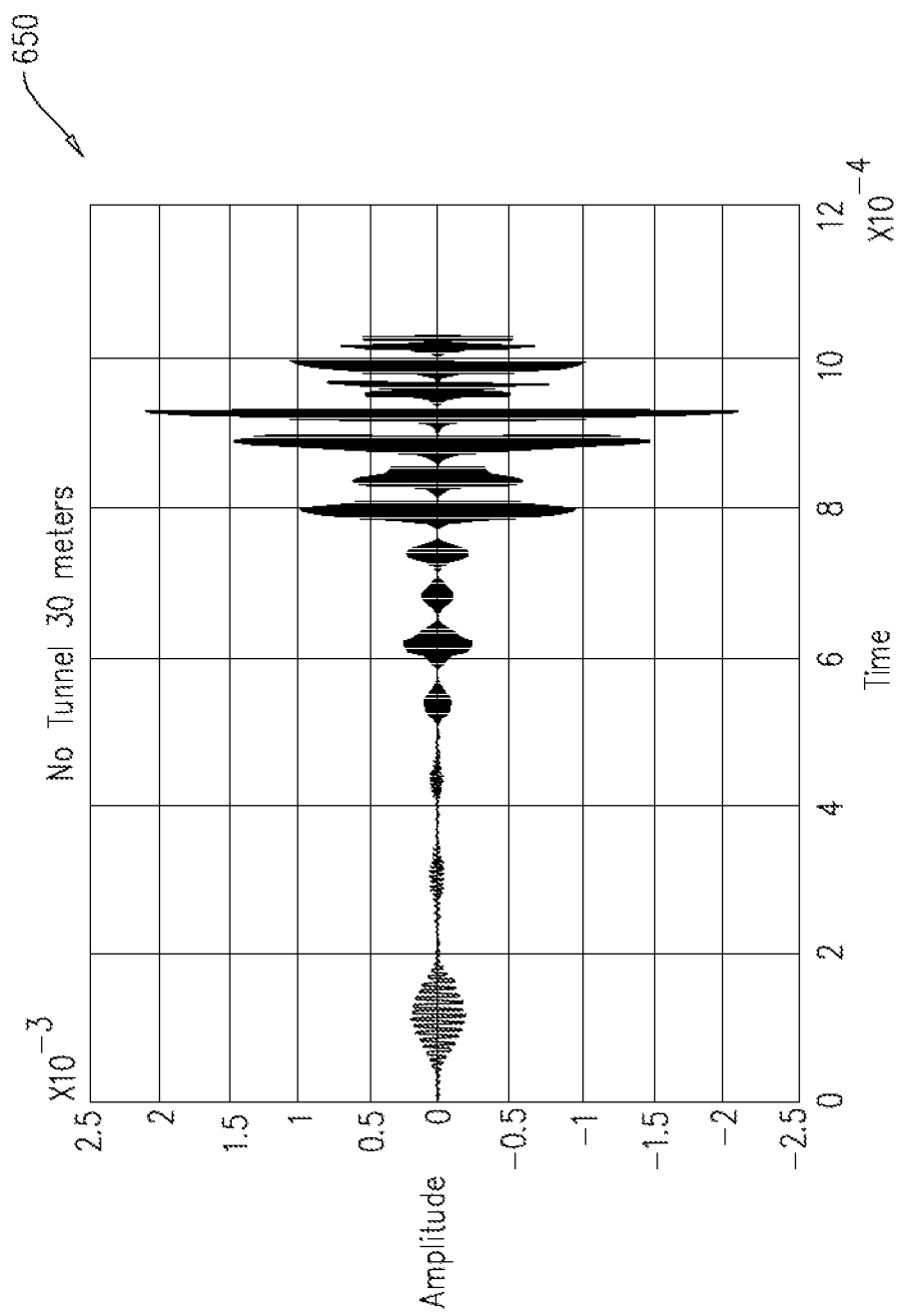
FIG. 7B is a graph of simulation results of the signal of FIG. 7A in time domain; according to an exemplary embodiment of the disclosure.

Similarly, FIG. 6B is a graph 650 of simulation results showing the signal of FIG. 6A in time domain and FIG. 7B is a graph 750 of simulation results showing the signal of FIG. 7A in time domain. By comparing graph 650 to graph 750 it is noticeable that the existence of a tunnel causes a larger disturbance than when there is no tunnel. Optionally, the sensors 120 were placed at a distance of 20 meters from search probe 110 with the search probe approximately above the location of the tunnel. The signal shown in FIGS. 6A, 6B, 7A and 7B is the Diff1 signal (S1−S2) described above.

Figure 8:
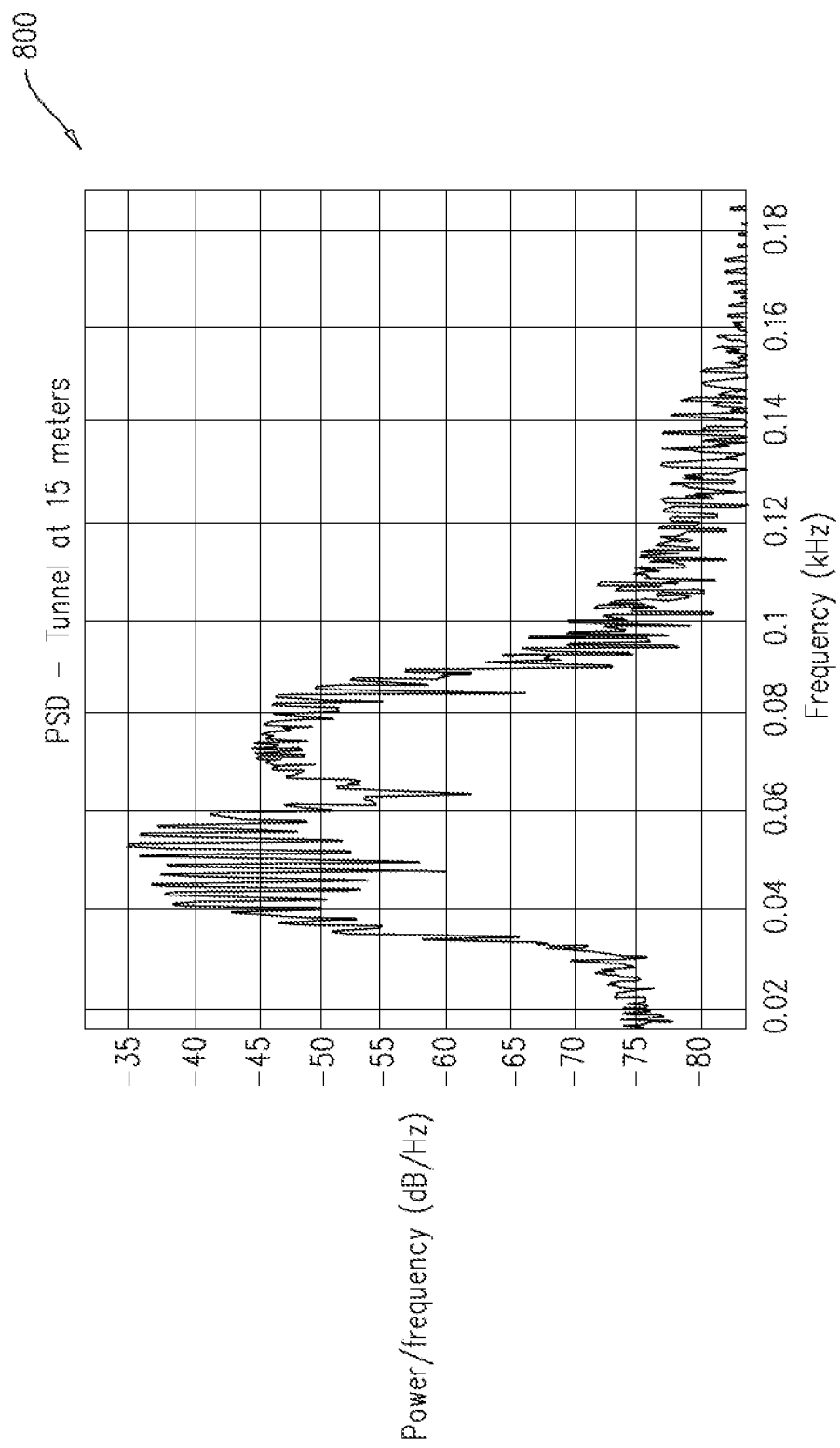
FIG. 8 is a graph of simulation results showing power spectral density versus frequency in a case having a tunnel at about 15 meters below the search probe; according to an exemplary embodiment of the disclosure.
Figure 9:
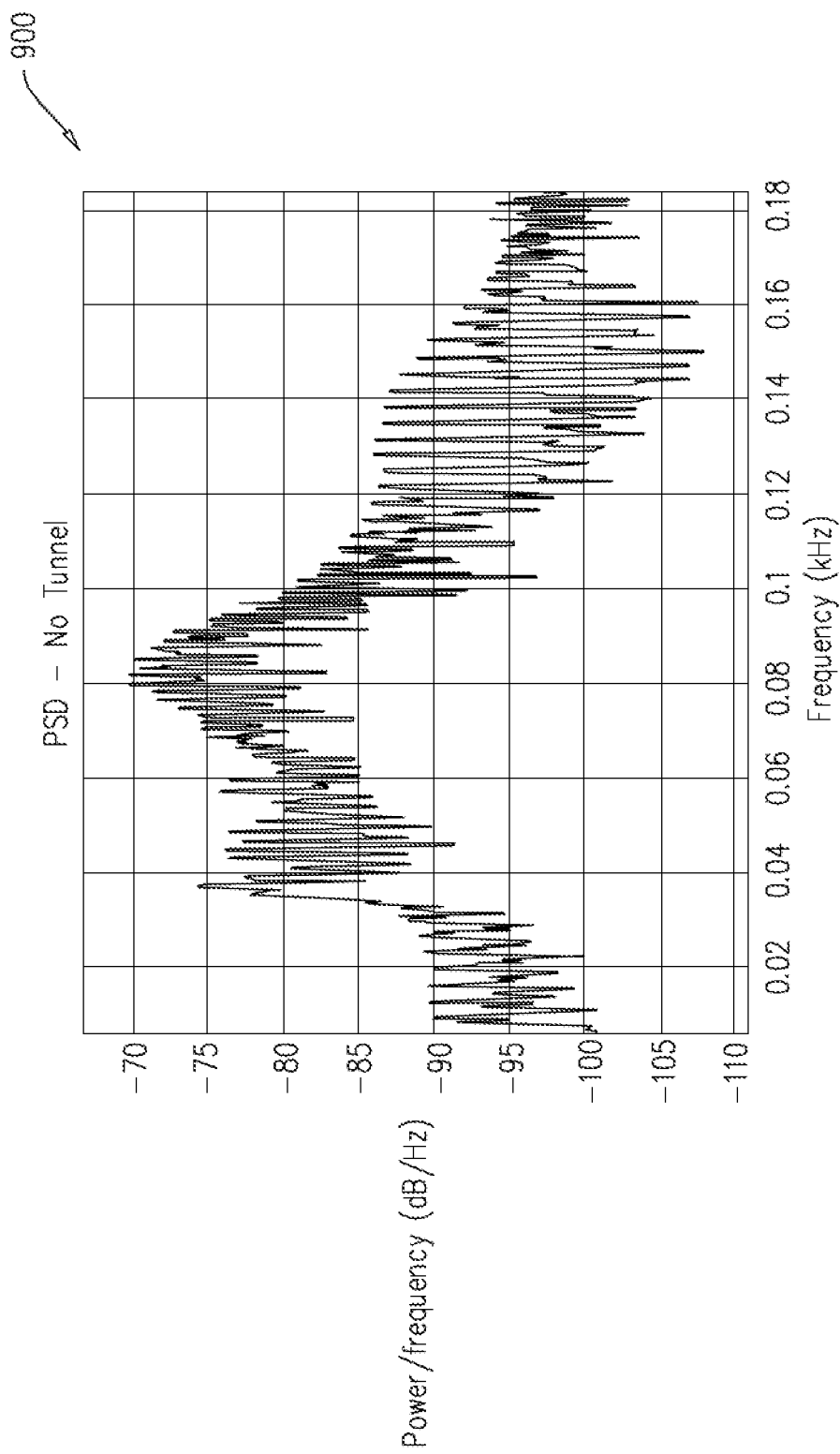
FIG. 9 is a graph of simulation results showing power spectral density versus frequency in a case not having a tunnel below the search probe; according to an exemplary embodiment of the disclosure.

FIG. 8 is a graph 800 of simulation results showing power spectral density versus frequency in a case having a tunnel at about 15 meters deep and FIG. 9 is a graph 900 of simulation results showing power spectral density versus frequency in a case not having a tunnel. As can be seen by comparing the signals especially between frequencies 0.04 to 0.09 KHz the tunnel caused a leap in the power by about 20 to 30 DB.

In an exemplary embodiment of the disclosure, It can be appreciated that the presence of a tunnel (searched entity 150) changes the signal and spectrograms of the subtracted sensor signals placed at 90 degrees' vs the search probe 110 and tunnel location. In an exemplary embodiment of the disclosure, instead of transmitting a signal at a specific frequency and advancing incrementally (e.g. from 2-300 Hz), a frequency modulated signal can be transmitted to save time and have the signal frequency scanned over a wide range of frequencies, typically 2-300 Hz as a single frequency scan.

In an exemplary embodiment of the disclosure, by selecting low frequencies the acoustic wavelength $\lambda$, is between 0.01-500 times the distance from the search probe 110 to the searched entity 150 (e.g. a tunnel). Optionally, when a quarter of the wavelength ($\lambda/4$) or odd divisions of it (e.g. $\lambda/4$ divided by 3, 5, 7 etc. corresponding to f, 3f, 5f, 7f etc.) approximately equal the distance from search probe 110 to the searched entity 150 then the reflected signal from the search entity 150 interferes with the transmitted signal 115 to form a resonance at the surface after a short period (e.g. a few seconds). The ground and searched entity 150 (e.g. a void/tunnel) can be viewed as an acoustic resonating chamber whose resonance frequency depends on the distance from the ground surface to an air filled void/tunnel buried in the ground. This effect is more preannounced when the ground composition is relatively uniform such as formed entirely from a uniform rock (e.g. limestone). In an exemplary embodiment of the disclosure, when the ground composition is not homogenous but rather composed of different materials having different densities, then it is harder to calculate an expected echo signal 125. Optionally, by testing the ground composition in the area and using the results to perform simulations on analysis device 160 the expected pressure wave velocities and shear wave velocities can be calculated and the expected echo signal 125 can be predicted.

As explained above two or more sensors 120 can be used in a single system 100 for detecting a searched entity 150. However it is possible to use a single sensor 120 by comparing (e.g. subtracting) the measurements of the system 100 (with a single sensor 120) in consecutive locations with the search probe 110 and sensors 120 positioned with the same relative distance (offset on the ground) and angle. In an exemplary embodiment of the disclosure, analysis device 160 stores the measurements from a first deployment of system 100. Then system 100 is deployed again in one or more consecutive locations with one or more sensors 120 positioned in the same relative locations (e.g. the same distance and angles from the search probe 110). The measurements from the consecutive deployments are recorded at analysis device 160 and the signals from respective sensors 120 are subtracted to compare them and analyze the effect of a shift in location of the system 100. The analysis may include comparing to a threshold value or signal, or comparing the subtracted signals from different sensors.

In an exemplary embodiment of the disclosure, one method of analysis includes using a search probe 110 and at least one receiving sensor 120 to detect resonance in the ground, and hence a searched entity 150 (e.g. a void or a tunnel). Resonance can be detected by scanning the frequencies of the transmitted acoustic wave and measuring the signal on the ground surface. A resonance will be detected when the reflected wave 125 from the searched entity 150 underground has the same phase relative to the transmitted signal 115. When the reflected signal is in phase with the transmitted signal 115, the interference creates a resonance at the sensor on the ground. Placing the acoustic sensor 120 at a distance from the transmitting source (search probe 110) so that it is not saturated by the strength of the acoustic signal 115 coming from the transmitter and allows the sensor 120 to detect the signals 125 returning from the searched entity 150 and resonating provided that the search probe 110 is close or just above the searched entity 150. Thus the resolution of the system is dictated by the step size of the probe sampling, for example 10-500 cm. In addition, the position of the receiving sensor 120 relative to the searched entity 150 and the transmitting search probe 110 influences the signal strength as well as the total spatial resolution of the system 100. For analysis, the power spectra from consecutive positions are subtracted from each other. When there is no tunnel or other void underneath, since the search probe 110 and the receiving sensor 120 are placed at the same relative distance in each consecutive measurement, subtracting any two locations will yield a small difference. But, if there is a tunnel or a void below, a greater difference will be measured when subtracting two measurements above the search entity 150.

As an example, if the depth from surface where the search probe 110 is operated to the search entity 150 is 25 meters, then $\lambda$ should be in the order of 100 meters. Since $\lambda=C/f$ where C is the velocity of sound in the ground and f is the acoustic wave frequency, if we assume C=2000 m/sec then, for $\lambda\sim100$ meters, the acoustic wave frequency f to detect resonance from this tunnel/void should be 20 Hz. Optionally, also, consecutive odd harmonics at 3f and 5 f etc. will also show resonance.

In an exemplary embodiment of the disclosure, the spatial resolution of the system (e.g. determining the minimal size of the searched entity 150 that can be detected) depends on performing consecutive scanning at close intervals, for example moving the search probe 110 by about 10-500 cm. Optionally, this enables detection of small searched entities 150 of about 1-5 meters in diameter. The system resolution is dependent on the step size of positioning search probe 110 and the relative position of the receiving sensors 120 to search probe 110 and the relative position of the searched entity 150 to both the search probe 110 and the receiving sensors 120.

In an exemplary embodiment of the disclosure, a sensor 135 (see FIG. 1B) with low sensitivity is placed on the search probe 110 and data from sensor 125 is collected while the search probe 110 transmits. This signal is then used as a reference for an adaptive filter to subtract signals that emanate from the search probe 110 and reach the sensors 120 directly, and are not reflected from the searched entity 150.

In an exemplary embodiment of the disclosure, water is used to wet the ground in the search area to increase the sound velocity. This is especially important in areas where the ground sound velocity is low, say around 500 m/sec. Adding water to wet the area increases the sound velocity to more than 1000 m/sec, and even to around 2000 m/sec. This also increases the contrast between the ground sound velocity (~2000 m/sec) and (~300 m/sec) for air thus improving the strength of the measurements of the sensors 120.

In an exemplary embodiment of the disclosure, the search is conducted in two phases. The first phase is a low resolution search for search entities 150. For this first phase, the search probe is advanced by long distances between the search points, typically 2 to 50 meters and the search team or automatic algorithm look for characteristics of a possible searched entity 150. Optionally, once detecting a suspect searched entity 150 a search is conducted with small advances (e.g. 10-500 cm) to acquire more exact details such as depth, width, propagation direction (for a tunnel), optimal signal frequency for the location (depending on soil type).

In an exemplary embodiment of the disclosure, the offset of the position of the search probe 110 relative to the position that is directly above the searched entity 150 (e.g. a tunnel) has an effect on the measurements of the sensors 120. Optionally, the detection of a tunnel can be achieved with an offset of the search probe 110 even as far as 50 meters from the position directly above the search entity 110.

In an exemplary embodiment of the disclosure, at frequencies of about 20-90 Hz the power spectrum will typically increase in amplitude in the presence of a tunnel at a depth of up to 100 meters and thus provide an indication of the presence of the tunnel. However at the lower frequencies of about 2-20 Hz the power spectrum will remain with relative low amplitudes until the search probe 110 has an offset of about 10 meters or less. Thus an increase in the power of the lower frequencies provides an indication that the search probe 110 is getting close to being directly above the searched entity 150.

Typically, after low resolution detection of a possible tunnel in the vicinity of the search probe 110, the search goes into high resolution phase, at which time the search interval will typically be 10 cm to 5 meters. In this phase, the search probe 110 is expected to be close to being directly above the tunnel. Optionally, the power at the low frequencies (typically 2-20 Hz) are monitored and changes at these frequencies provide an indication that a tunnel is almost directly below the search probe 110.

Figure 10:
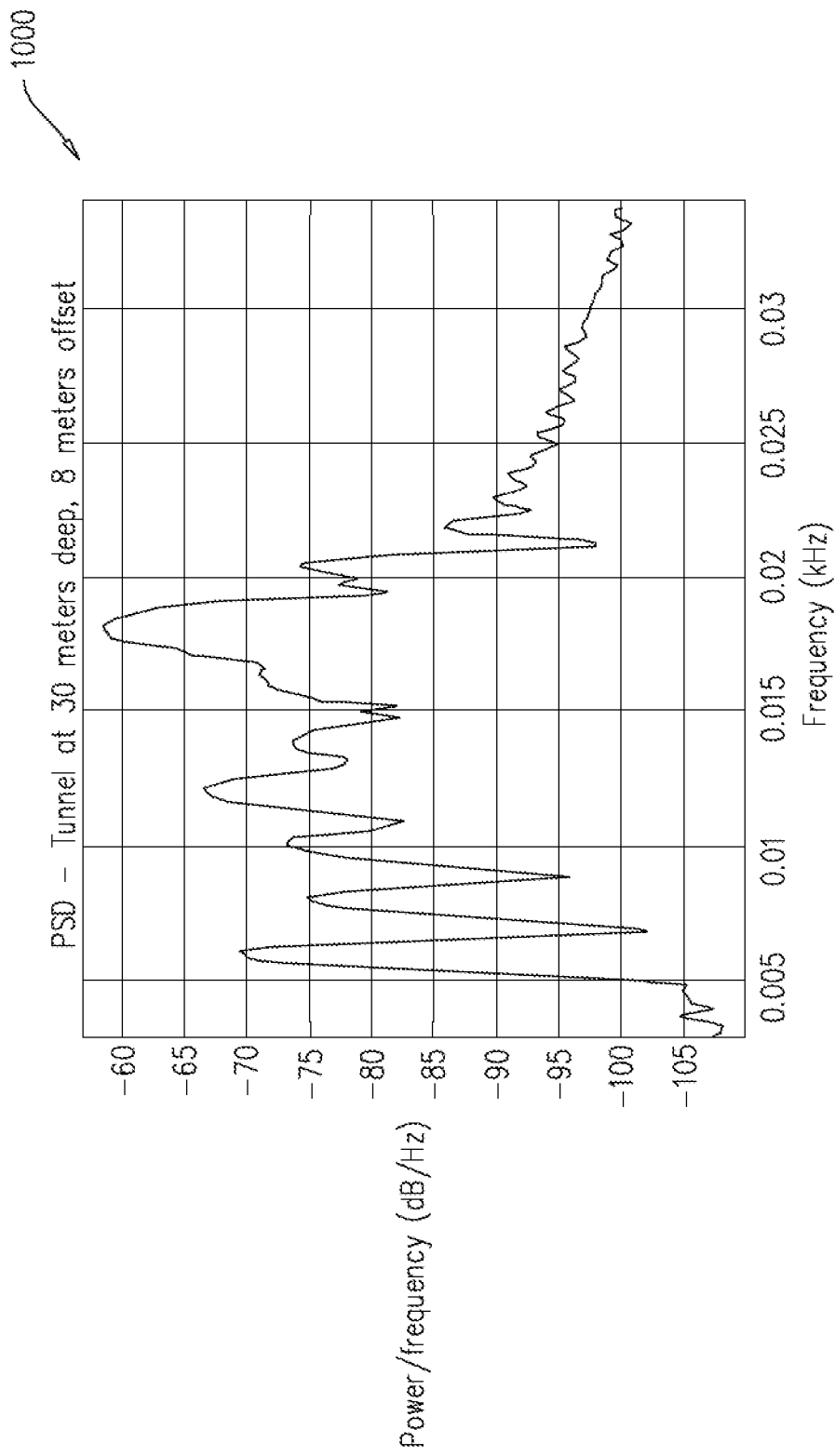
FIG. 10 is a graph of simulation results of power spectrum density for a tunnel 30 meters underground detected by a search probe positioned with an offset of 8 meters on the ground surface from the position directly above the tunnel; according to an exemplary embodiment of the disclosure.

FIG. 10 is a graph 1000 of simulation results showing a power spectrum density of a tunnel 30 meters underground detected by a search probe 110 positioned with an offset of 8 meters on the ground surface from the position directly above the tunnel.

Figure 11:
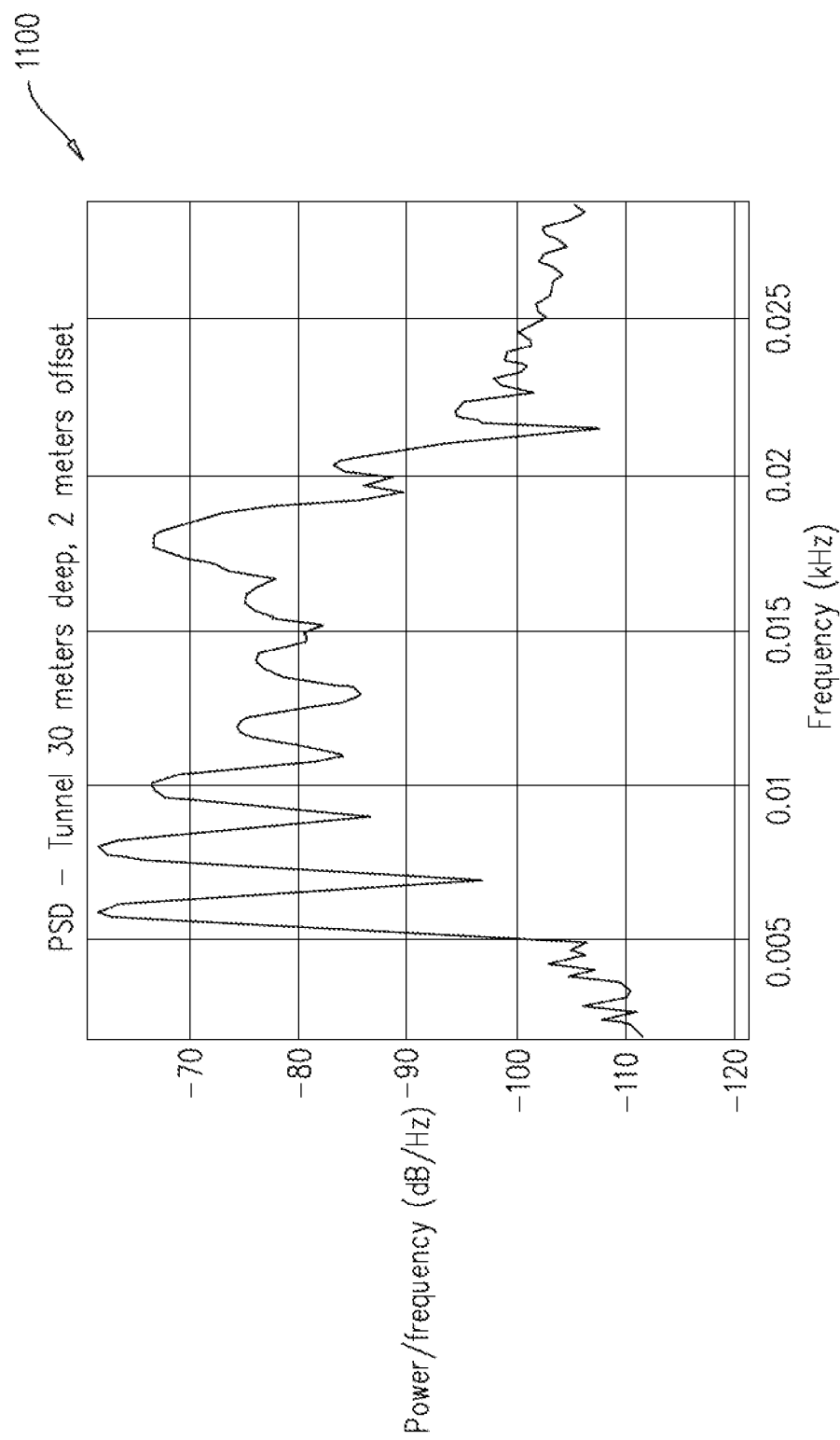
FIG. 11 is a graph of simulation results of power spectrum density for a tunnel 30 meters underground detected by a search probe positioned with an offset of 2 meters on the ground surface from the position directly above the tunnel; according to an exemplary embodiment of the disclosure.

FIG. 11 is a graph 1100 of simulation results showing a power spectrum density of the same tunnel when the search probe 110 is positioned with an offset of 2 meters on the ground surface from the position directly above the tunnel. One can appreciate the substantial increase in low frequency signals, (6-10 Hz) in this particular case.

Figure 12:
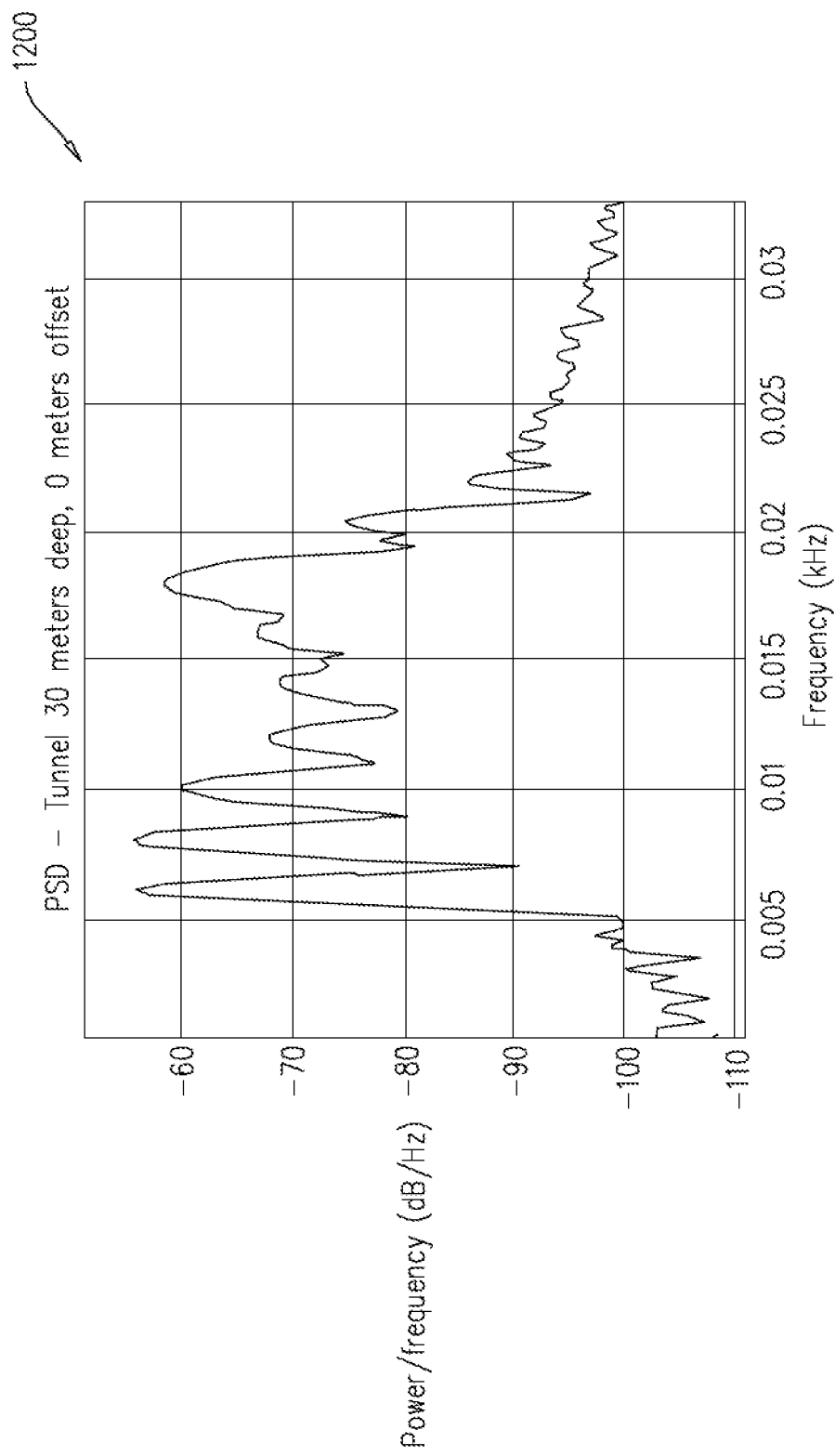
FIG. 12 is a graph of simulation results of power spectrum density for a tunnel 30 meters underground detected by a search probe positioned directly above the tunnel; according to an exemplary embodiment of the disclosure.

FIG. 12 is a graph 1200 of a power spectrum density of the same tunnel when the search probe 110 is positioned directly above the tunnel.

One can appreciate from FIGS. 10, 11 and 12, the substantial increase in power at the low frequency signals, (6-10 Hz) as the search probe 110 gets closer to being directly above the search entity 150, thus providing an indication if getting closer to the location of the searched entity 150.

In an exemplary embodiment of the disclosure, a prototype system was constructed and data was accumulated as described above from a site near Netanya (Israel). A large drain pipe with a diameter of 2.5 meters is buried below sandstone and sand and was scanned in 2 locations. In the first location the pipe is 9 meters deep and in the second location the pipe is 20 meters deep. In both cases, the system detected the position, direction and depth of the pipe accurately with a good quality signal.

Figure 13:
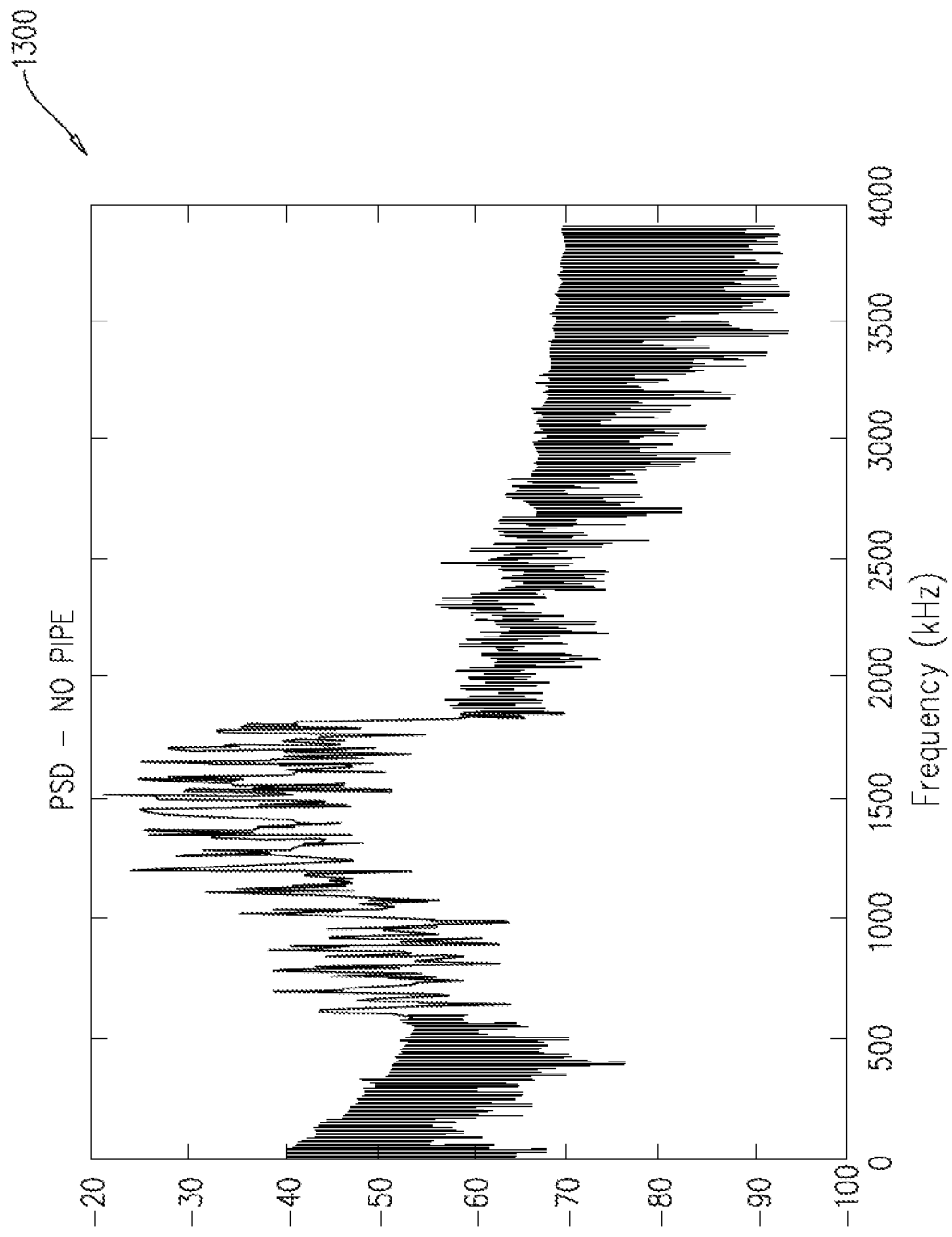
FIG. 13 is a graph of measured results of power spectral density for a search probe without a pipe underneath; according to an exemplary embodiment of the disclosure.

FIG. 13 is a graph 1300 from measured results showing a power spectral density without a pipe under the search probe 110.

Figure 14:
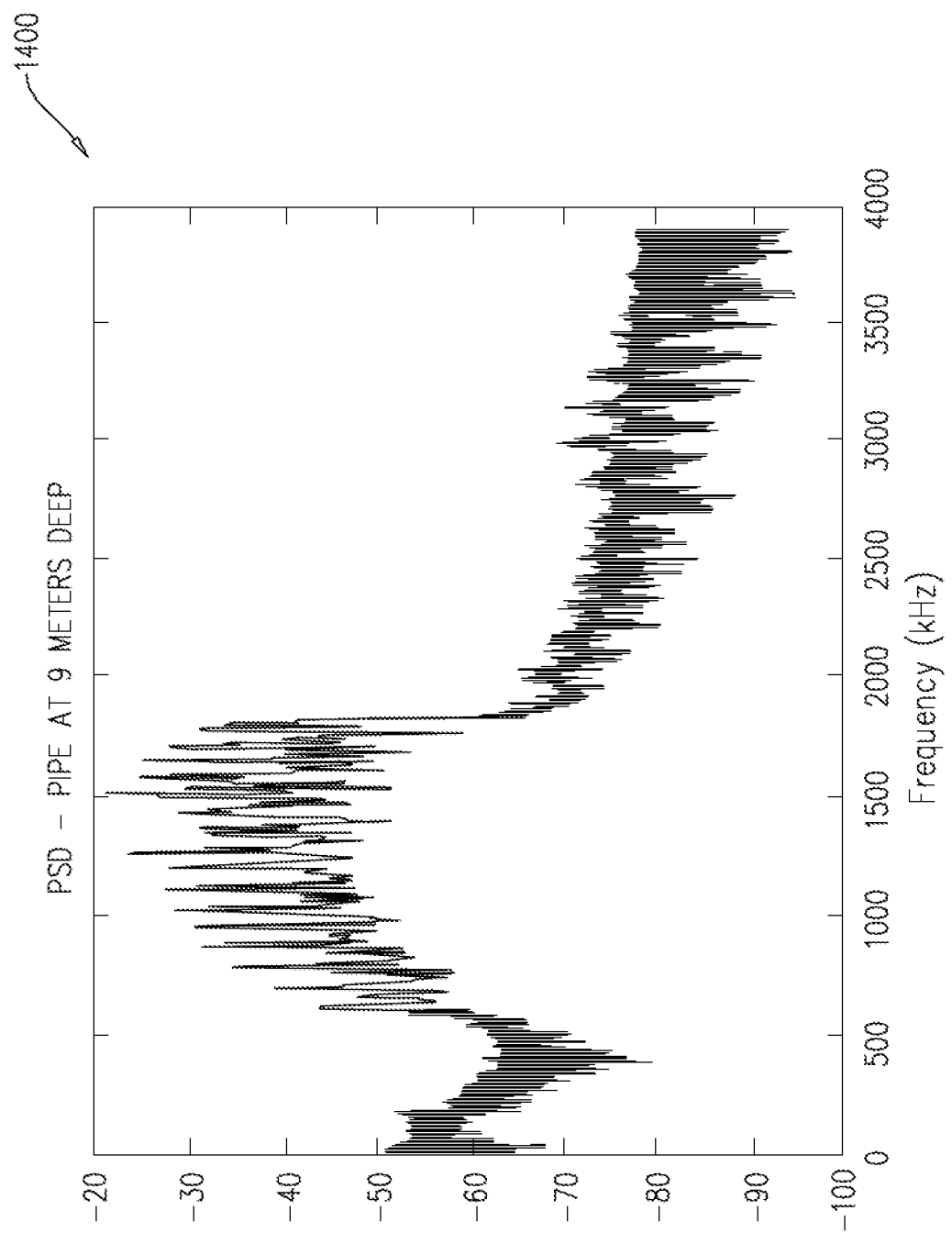
FIG. 14 is a graph of measured results of power spectral density for a search probe with a pipe 9 meters below the search probe; according to an exemplary embodiment of the disclosure.

FIG. 14 is a graph 1400 from measured results showing a power spectral density with a pipe at 9 meters below the search probe 110.

Figure 15:
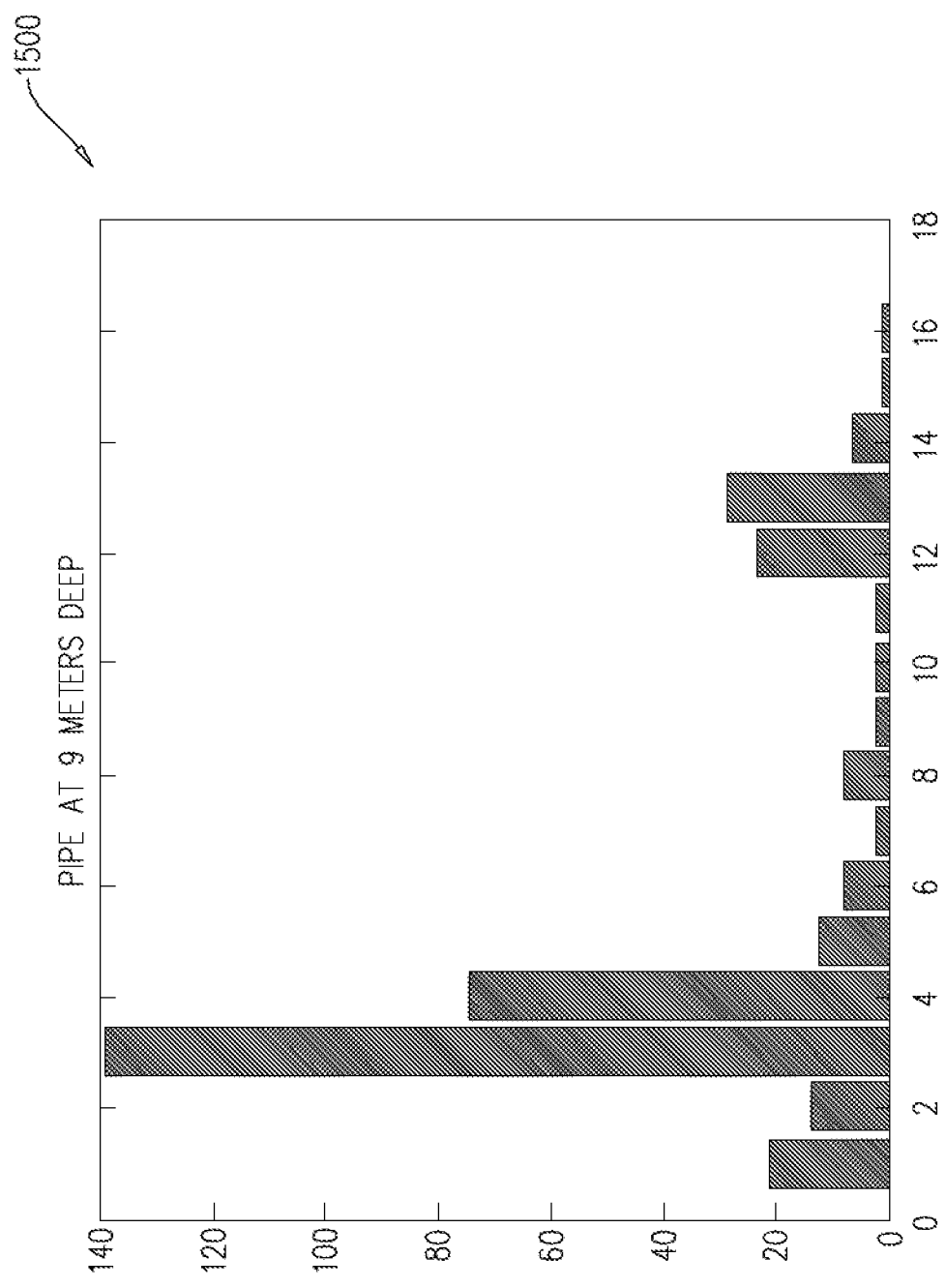
FIG. 15 is a histogram of measured results showing a spectral integral vs. scan location based on the post analysis for a pipe 9 meters below the search probe; according to an exemplary embodiment of the disclosure.

FIG. 15 is a histogram 1500 from measured results showing a spectral integral vs. scan location based on the post analysis for the pipe at 9 meters underground. The histogram 1500 shows the max signal where the pipe was immediately under the scanning probe.

Figure 16:
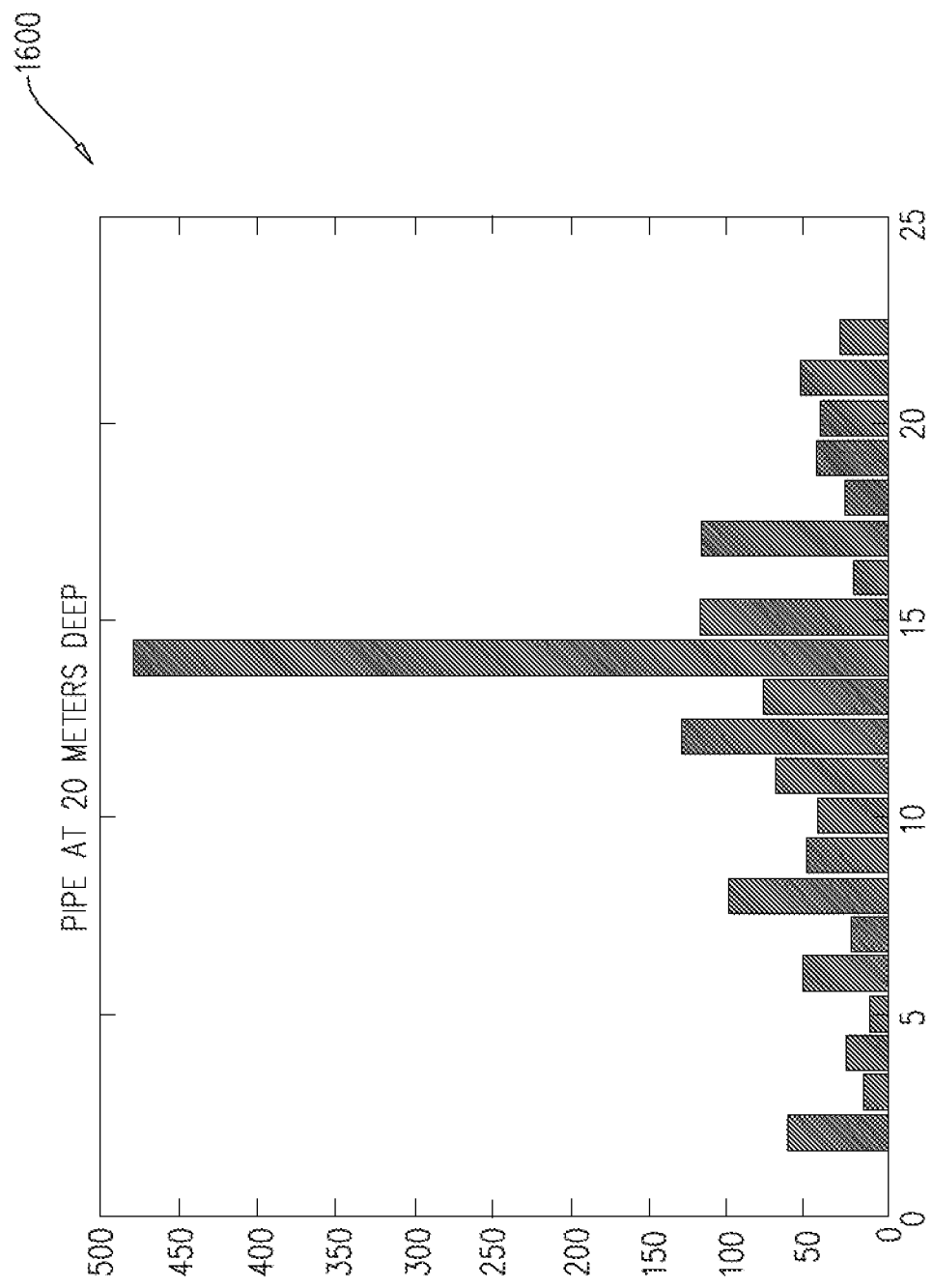
FIG. 16 is a histogram of measured results showing a spectral integral vs. scan location based on the post analysis for a pipe 20 meters below the search probe; according to an exemplary embodiment of the disclosure.

FIG. 16 is a histogram 1600 from measured results showing a spectral integral vs. scan location based on the post analysis for the pipe at 20 meters underground. The histogram 1600 shows the max signal where the pipe was immediately under the scanning probe.

It should be appreciated that the above described methods and apparatus may be varied in many ways, including omitting or adding steps, changing the order of steps and the type of devices used. It should be appreciated that different features may be combined in different ways. In particular, not all the features shown above in a particular embodiment are necessary in every embodiment of the disclosure. Further combinations of the above features are also considered to be within the scope of some embodiments of the disclosure.

It will be appreciated by persons skilled in the art that the present invention is not limited to what has been particularly shown and described hereinabove. Rather the scope of the present invention is defined only by the claims, which follow.

We claim:

1. A system for searching for underground entities in ground of an area, comprising:
   a search probe configured to generate and deliver an acoustic signal into the ground of the area; wherein the acoustic signal uses a low frequency signal so that wavelengths of the acoustic signal are between 0.01-500 times the depth to the sought underground entity;
   two or more sensors positioned on the ground at about an equal distance from the search probe at different angles;
   an analysis device that receives measurements from the two or more sensors in the form of a measured echo signal responsive to the delivered acoustic signal and reflected signals;
   wherein said analysis device designates pairs of sensors and subtracts their echo signals to identify a difference indicating the existence of an underground entity;
   wherein the delivered acoustic signal has a frequency that advances incrementally within a range between 2 to 300 Hz scanning for a preselected time at each frequency; and
   wherein the preselected time provides time to reach a steady state between the delivered acoustic signal and reflected signals forming the echo signal at the scanned frequency.

2. The system according to claim 1, wherein the designated pairs of sensors are positioned approximately orthogonal to each other relative to the search probe.

3. The system according to claim 1, wherein the designated pairs of sensors are positioned to form an angle of between 85 to 95 degrees between them relative to the search probe.

4. The system according to claim 1, wherein the difference is identified by comparing a result of the subtracted signals to a threshold value.

5. The system according to claim 1, wherein the difference is identified by comparing the subtraction of multiple pairs and detecting a distinct deviation.

6. The system according to claim 1, wherein an even number of sensors is used.

7. The system according to claim 1, wherein an odd number of sensors is used and at least one sensor is paired twice.

8. The system according to claim 1, wherein at least one sensor is ignored.

9. The system according to claim 1, wherein a direction of the search entity is determined by detecting the search entity on two opposite sides of the search probe.

10. The system according to claim 1, wherein the steady state of the echo signal forms a resonance standing wave at specific frequencies when detecting an underground entity.

11. The system according to claim 1, wherein the distance from the search probe to the sensors is between 1 to 60 meters.

12. A method for searching for underground entities in ground of an area, comprising:
   generating an acoustic signal into the ground of the area with a search probe; wherein the acoustic signal uses a low frequency signal so that wavelengths of the acoustic signal are between 0.01-500 times the depth to the sought underground entity;
   measuring echo signals responsive to the delivered acoustic signal and reflected signals with sensors from two or more positions on the ground at about an equal distance from the search probe at different angles;
   receiving the measured echo signals from the two or more sensors by an analysis device;
   designating pairs of sensors and subtracting their echo signals to identify a difference indicating the existence of an underground entity;
   wherein the delivered acoustic signal has a frequency that advances incrementally within a range between 2 to 300 Hz scanning for a preselected time at each frequency; and
   wherein the preselected time provides time to reach a steady state between the delivered acoustic signal and reflected signals forming the echo signal at the scanned frequency.

13. The method according to claim 12, wherein the designated pairs of sensors are positioned approximately orthogonal to each other relative to the search probe.

14. The method according to claim 12, wherein the difference is identified by comparing a result of the subtracted signals to a threshold value.

15. The method according to claim 12, wherein the difference is identified by comparing the subtraction of multiple pairs and detecting a distinct deviation.

16. The method according to claim 12, wherein a direction of the search entity s determined by detecting the search entity on two opposite sides of the search probe.

17. The method according to claim 12, wherein the steady state of the echo signal forms a resonance standing wave at specific frequencies when detecting an underground entity.

18. A system for searching for underground entities in ground of an area, comprising:
   a search probe configured to generate and deliver an acoustic signal into the ground of the area; wherein the acoustic signal uses a low frequency signal so that wavelengths of the acoustic signal are between 0.01-500 times the depth to the sought underground entity;
   one or more sensors positioned on the ground at about an equal distance from the search probe at different angles;
   an analysis device that is configured to receive measurements in the form of a measured echo signal, responsive to the delivered acoustic signal and reflected signals, from respective sensors of consecutive deployments of the search probe and sensors; wherein the respective sensors are positioned with the same relative distances and angles in each deployment;

wherein said analysis device designates pairs of respective sensors from consecutive deployments and subtracts their echo signals to identify a difference indicating the existence of an underground entity;

wherein the delivered acoustic signal has a frequency that advances incrementally within a range between 2 to 300 Hz scanning for a preselected time at each frequency; and wherein the preselected time provides time to reach a steady state between the delivered acoustic signal and reflected signals forming the echo signal at the scanned frequency.

19. The system according to claim 18, wherein the steady state of the echo signal forms a resonance standing wave at specific frequencies when detecting an underground entity.

* * * * *